(12) United States Patent
Routhier

(10) Patent No.: US 11,785,197 B2
(45) Date of Patent: *Oct. 10, 2023

(54) VIEWER-ADJUSTED STEREOSCOPIC IMAGE DISPLAY

(71) Applicant: INNOVATIONS MINDTRICK INC., Montréal (CA)

(72) Inventor: Nicholas Routhier, Montréal (CA)

(*) Notice: Subject to any disclaimer, the term of this patent is extended or adjusted under 35 U.S.C. 154(b) by 18 days.

This patent is subject to a terminal disclaimer.

(21) Appl. No.: 17/647,605

(22) Filed: Jan. 11, 2022

(65) Prior Publication Data

US 2022/0256133 A1    Aug. 11, 2022

Related U.S. Application Data

(63) Continuation of application No. 17/137,833, filed on Dec. 30, 2020, now Pat. No. 11,240,479, which is a (Continued)

(51) Int. Cl.
*H04N 13/139* (2018.01)
*H04N 13/128* (2018.01)
(Continued)

(52) U.S. Cl.
CPC ........ *H04N 13/139* (2018.05); *H04N 5/2628* (2013.01); *H04N 13/128* (2018.05); *H04N 13/156* (2018.05); *H04N 13/167* (2018.05); *H04N 13/239* (2018.05); *H04N 13/302* (2018.05); *H04N 13/332* (2018.05); *H04N 23/698* (2023.01); *H04N 2213/002* (2013.01)

(58) Field of Classification Search
CPC .. H04N 13/139; H04N 5/2628; H04N 13/128; H04N 13/156; H04N 13/167; H04N 13/239; H04N 13/302; H04N 13/332; H04N 23/698; H04N 2213/002; H04N 13/334; H04N 13/337; H04N 13/341; H04N 13/117; H04N 13/122; H04N 13/373; H04N 13/232; G09G 2213/002
See application file for complete search history.

(56) References Cited

U.S. PATENT DOCUMENTS 4,751,570 A    6/1988  Robinson
4,881,122 A   11/1989  Murakami
(Continued)

FOREIGN PATENT DOCUMENTS

AU    2003215852 A8    9/2003
CN        1848966 A   10/2006
(Continued)

OTHER PUBLICATIONS

Corresponding Japanese application No. 2020-558660 Search Report dated Sep. 21, 2022.
(Continued)

*Primary Examiner* — Howard D Brown, Jr.
*Assistant Examiner* — Tyler B Edwards

(57) ABSTRACT

A stereoscopic video playback device is provided that processes original stereoscopic image pairs taken using parallel-axis cameras and provided for viewing under original viewing conditions by scaling and cropping to provide new viewing condition stereoscopic video on a single screen.

20 Claims, 32 Drawing Sheets

Display FOV changes with distance to screen

Related U.S. Application Data continuation of application No. 16/783,784, filed on Feb. 6, 2020, now Pat. No. 10,917,623, which is a continuation of application No. PCT/CA2018/051039, filed on Aug. 29, 2018.

(60) Provisional application No. 62/627,825, filed on Feb. 8, 2018, provisional application No. 62/551,942, filed on Aug. 30, 2017.

(51) Int. Cl.
    H04N 13/167    (2018.01)
    H04N 13/332    (2018.01)
    H04N 13/156    (2018.01)
    H04N 13/302    (2018.01)
    H04N 13/239    (2018.01)
    H04N 5/232     (2006.01)
    H04N 5/262     (2006.01)
    H04N 23/698    (2023.01)

(56) References Cited

U.S. PATENT DOCUMENTS

| | | | |
|---|---|---|---|
| 5,063,441 A | 11/1991 | Lipton et al. | |
| 5,065,236 A | 11/1991 | Diner | |
| 5,142,357 A | 8/1992 | Lipton et al. | |
| 5,179,441 A | 1/1993 | Anderson et al. | |
| 5,973,700 A | 10/1999 | Taylor et al. | |
| 6,005,607 A | 12/1999 | Uomori et al. | |
| 6,125,198 A | 9/2000 | Onda | |
| 6,198,484 B1 | 3/2001 | Kameyama | |
| 6,414,709 B1 | 7/2002 | Palm et al. | |
| 6,512,892 B1 | 1/2003 | Montgomery et al. | |
| 6,608,923 B1 | 8/2003 | Zhang et al. | |
| 6,798,406 B1 | 9/2004 | Jones et al. | |
| 7,085,410 B2 | 8/2006 | Redert | |
| 7,113,632 B2 | 9/2006 | Lee et al. | |
| 7,705,876 B2 | 4/2010 | Starkweather et al. | |
| 8,116,557 B2 | 2/2012 | Ha et al. | |
| 8,228,327 B2 | 7/2012 | Hendrickson et al. | |
| 8,368,690 B1 | 2/2013 | Hoppenstein et al. | |
| 8,384,771 B1 | 2/2013 | Douglas | |
| 8,451,326 B2 | 5/2013 | Inaba | |
| 8,666,241 B2 * | 3/2014 | Cameron | G03B 35/08 396/89 |
| 8,743,185 B2 | 6/2014 | Yamaguchi et al. | |
| 9,848,178 B2 | 12/2017 | Mayhew et al. | |
| 10,154,243 B2 | 12/2018 | He et al. | |
| 10,917,623 B2 * | 2/2021 | Routhier | H04N 13/156 |
| 11,240,479 B2 * | 2/2022 | Routhier | H04N 13/128 |
| 2001/0015753 A1 | 8/2001 | Myers | |
| 2007/0247522 A1 | 10/2007 | Holliman | |
| 2011/0243543 A1 | 10/2011 | Pace et al. | |
| 2012/0139906 A1 | 6/2012 | Zhang et al. | |
| 2012/0249532 A1 | 10/2012 | Kawada | |
| 2013/0208095 A1 | 8/2013 | Cameron et al. | |
| 2014/0293027 A1 | 10/2014 | Omori | |
| 2015/0085089 A1 | 3/2015 | Shigemura | |
| 2015/0358539 A1 | 12/2015 | Catt | |
| 2016/0014389 A1 | 1/2016 | Ono et al. | |
| 2016/0165215 A1 | 6/2016 | Gu et al. | |
| 2016/0234483 A1 * | 8/2016 | Hirai | H04N 13/344 |
| 2016/0344999 A1 | 11/2016 | Lajeunesse et al. | |

FOREIGN PATENT DOCUMENTS

| | | |
|---|---|---|
| CN | 102075694 A | 5/2011 |
| CN | 101523924 B | 7/2011 |
| CN | 102484738 A | 5/2012 |
| CN | 101755236 B | 7/2012 |
| CN | 102710952 A | 10/2012 |
| CN | 103605211 A | 2/2014 |
| CN | 104023221 A | 9/2014 |
| CN | 106228530 A | 12/2016 |
| CN | 106251403 A | 12/2016 |
| EP | 1083454 B1 | 2/2006 |
| EP | 2309764 A1 | 4/2011 |
| EP | 1143747 B1 | 10/2011 |
| EP | 1967016 B1 | 9/2012 |
| EP | 2188672 B1 | 10/2014 |
| EP | 1582074 B1 | 3/2017 |
| EP | 2876879 B1 | 9/2017 |
| JP | 2005-339313 A | 12/2005 |
| JP | 4762994 B2 | 8/2011 |
| JP | 4787905 B1 | 10/2011 |
| JP | 2012129896 A | 7/2012 |
| JP | 5014979 B2 | 8/2012 |
| JP | 2013009076 A | 1/2013 |
| JP | 2013-126106 A | 6/2013 |
| JP | 5521913 B2 | 6/2014 |
| JP | 2014-192877 A | 10/2014 |
| JP | 2016-519480 A | 6/2016 |
| KR | 20020037097 A | 5/2002 |
| KR | 20070021694 A | 2/2007 |
| KR | 20070081962 A | 8/2007 |
| KR | 100809049 B1 | 3/2008 |
| KR | 101069209 B1 | 9/2011 |
| KR | 101095392 B1 | 12/2011 |
| KR | 20160021446 A | 2/2016 |
| KR | 20170017700 A | 2/2017 |
| WO | 03/073738 A2 | 9/2003 |
| WO | 2011/114572 A1 | 9/2011 |
| WO | 2011/123700 A1 | 10/2011 |
| WO | 2011/129488 A1 | 10/2011 |
| WO | 2012/117703 A1 | 9/2012 |
| WO | 2015/005826 A1 | 1/2015 |
| WO | 2015/100490 A1 | 7/2015 |

OTHER PUBLICATIONS

Corresponding Japanese application No. 2020-558660 Notice of Reasons for Refusal dated Oct. 25, 2022.
Corresponding Indian application No. 202017025398 Office Action dated May 4, 2022.
International application No. PCT/CA2018/051039 International Preliminary Report on Patentability Chapter I dated Aug. 11, 2020.
International application No. PCT/CA2018/051039 International Search Report dated Dec. 10, 2018.
International application No. PCT/CA2018/051039 Search Strategy dated Dec. 10, 2018.
International application No. PCT/CA2018/051039 Written Opinion of the International Searching Authority dated Dec. 10, 2018.
Corresponding Korean Patent Appl'n. No. 10-2020-7020327 Office Action dated Apr. 23, 2021 with its English translation.
Jones, Graham R., et al. "Controlling perceived depth in stereoscopic images." SPIE, 2001.http://dro.dur.ac.uk/647/1/647.pdf".
Yamanoue, Hirokazu. "The differences between toed-in camera configurations and parallel camera configurations in shooting stereoscopic images." Multimedia and Expo, 2006 IEEE International Conference on. IEEE, 2006.https://pdfs.semanticscholar.org/aa71/c91e116d438bac6fb8d1eef17b12c65ef03e.pdf".
Robinett, Warren, and Jannick P. Rolland. "A computational model for the stereoscopic optics of a head-mounted display." Presence: Teleoperators & Virtual Environments 1.1 (1992): 45-62.http://www.creol.ucf.edu/Research/Publications/1396.PDF".
Stelmach, Lew B., et al. "Improving the visual comfort of stereoscopic images." Proc. SPIE. vol. 5006. 2003.http://proceedings.spiedigitallibrary.org/proceeding aspx?articleid=755603".
Grinberg, Victor S., Gregg W. Podnar, and M. W. Siegel. "Geometry of binocular imaging.", Stereoscopic Displays and Applications V (1994): 56-65.http://www.cs.cmu.edu/afs/cs/user/mws/OldFiles/Desktop/mws/ftp/papers/grinberg_spie94.pdf".
Woods, Andrew, Tom Docherty, and Rolf Koch. "Image distortions in stereoscopic video systems." Proc. SPIE. vol. 1915. 1993.http://www.andrewwoods3d.com/spie93pa.html".
W.A. Ijsselsteijn et al., "Subjective evaluation of stereoscopic images: Effects of camera parameters and display duration", IEEE

(56) References Cited

OTHER PUBLICATIONS

Transactions on Circuits and Systems for Video Technology (vol. 10, Issue: 2, Mar. 2000), pp. 225-233, Date of Publication: Mar. 2000.
Corresponding European application No. 18851801.3, the partial supplementary European search report dated Jul. 16, 2021.
Corresponding European application No. 18851801.3, the extended European search report dated Nov. 30, 2021.
Corresponding Korean Patent Appl'n. No. 10-2020-7020327 Written Decision on Registration dated Dec. 21, 2021 with ts English translation.
Corresponding Chinese application No. 201880088839.1, the Office Action dated Nov. 11, 2021, translation of the main examination opinion is provided.
Corresponding European application No. 18851801.3 examination report dated Apr. 12, 2023.

\* cited by examiner

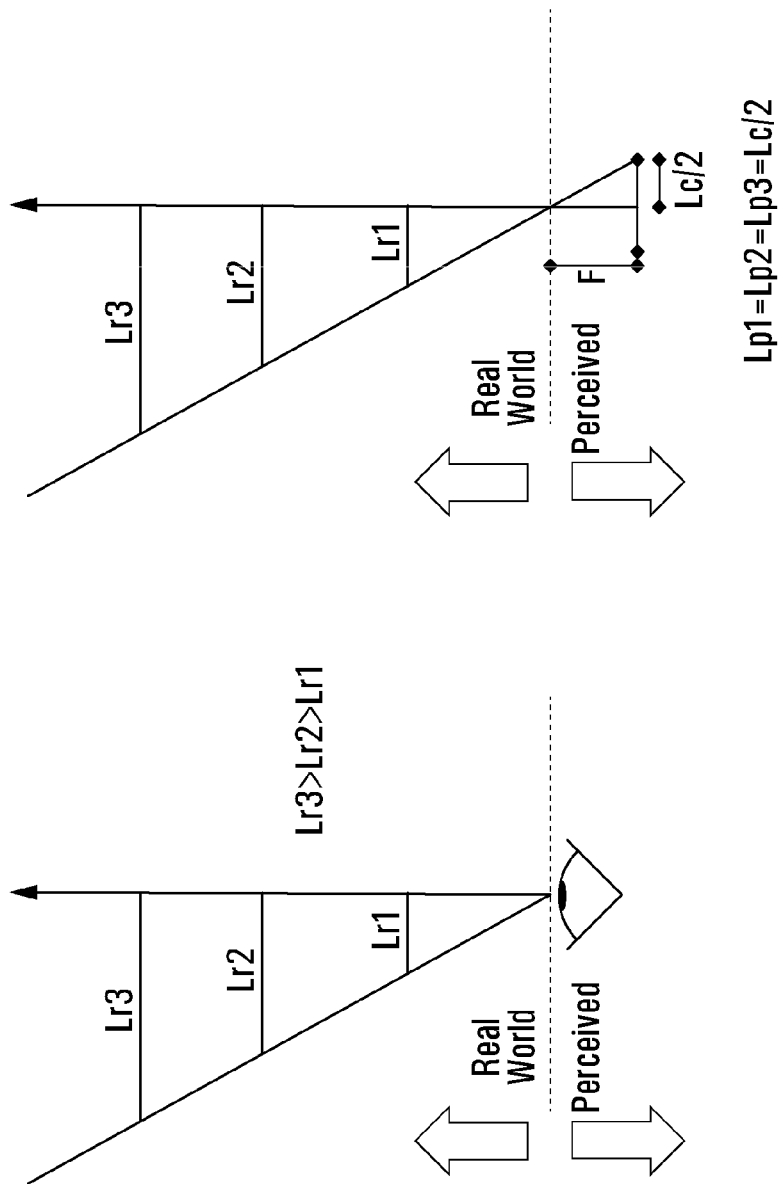

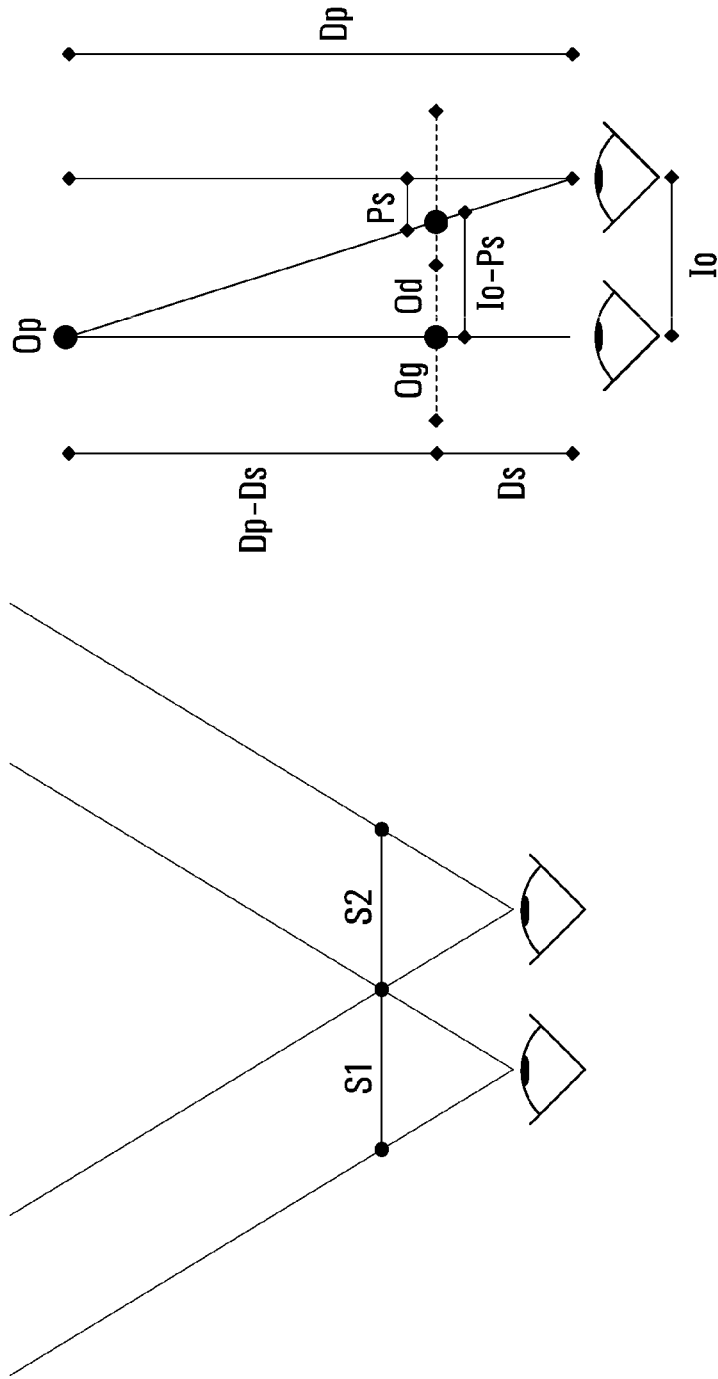

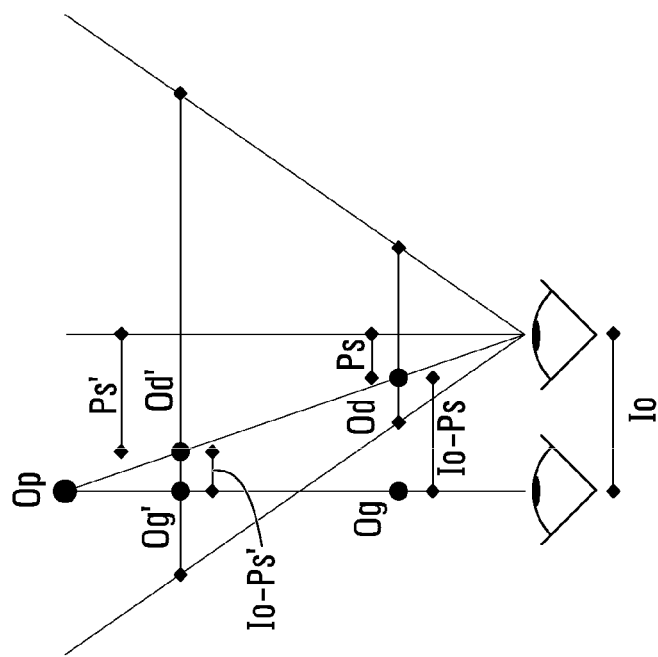
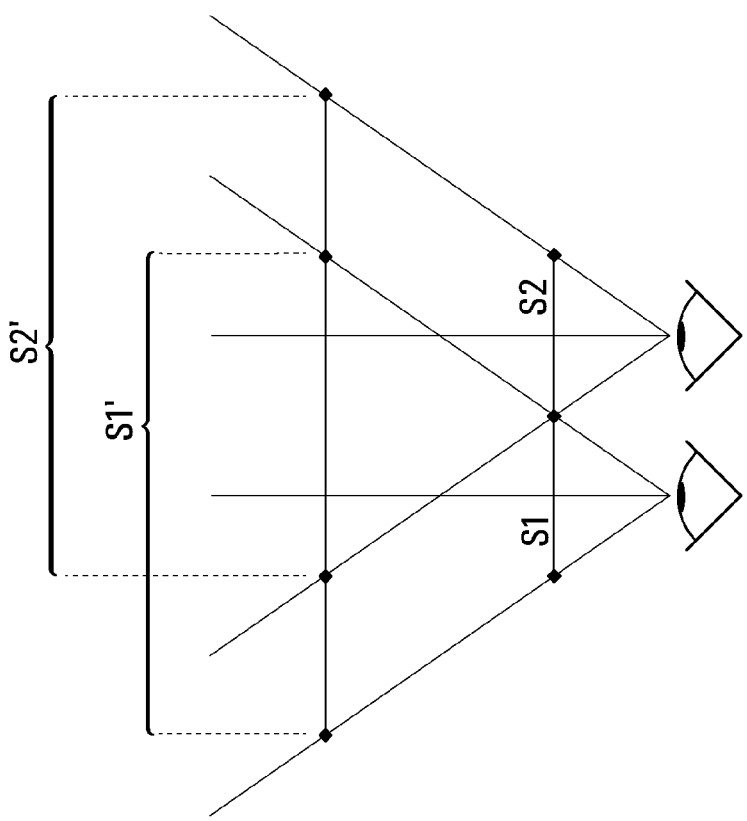
FIG. 9B
FIG. 9A

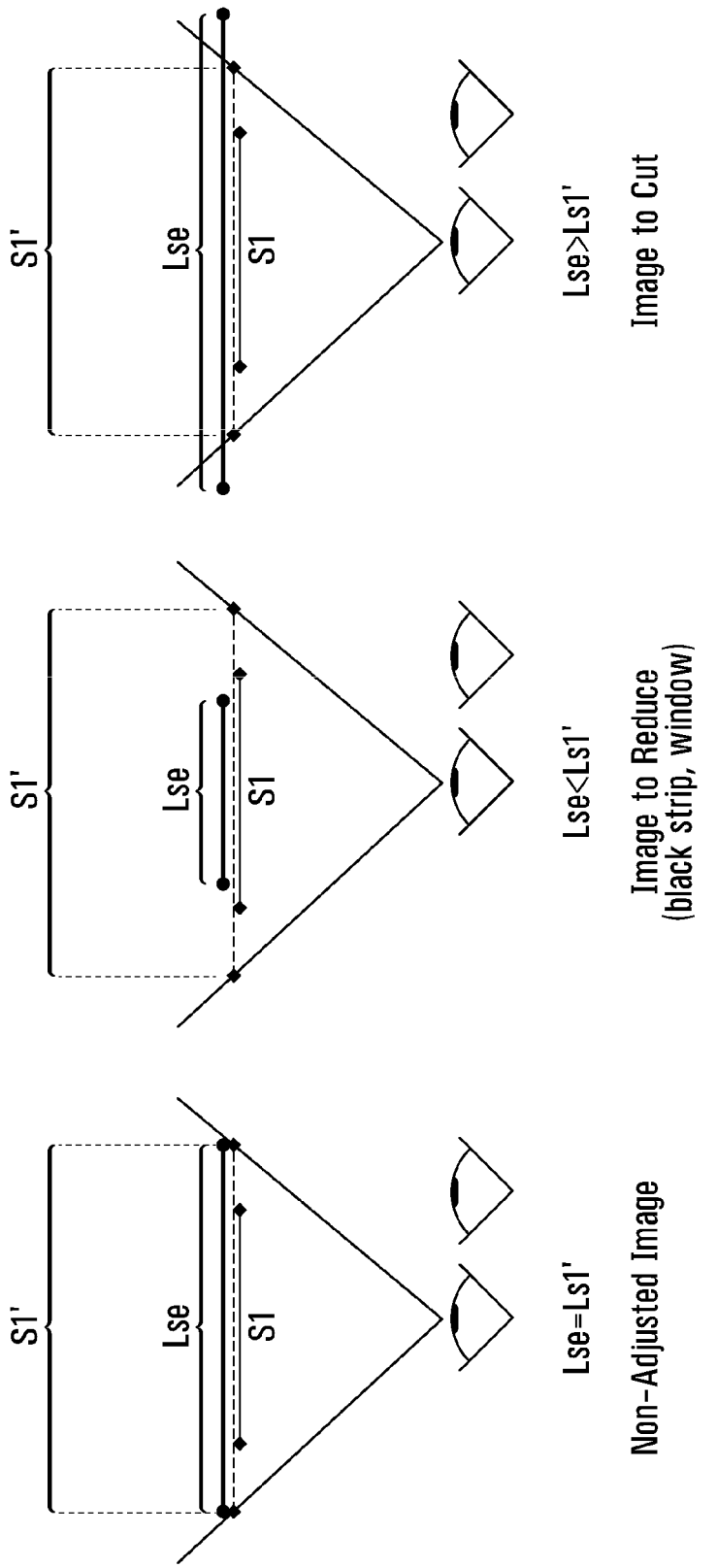

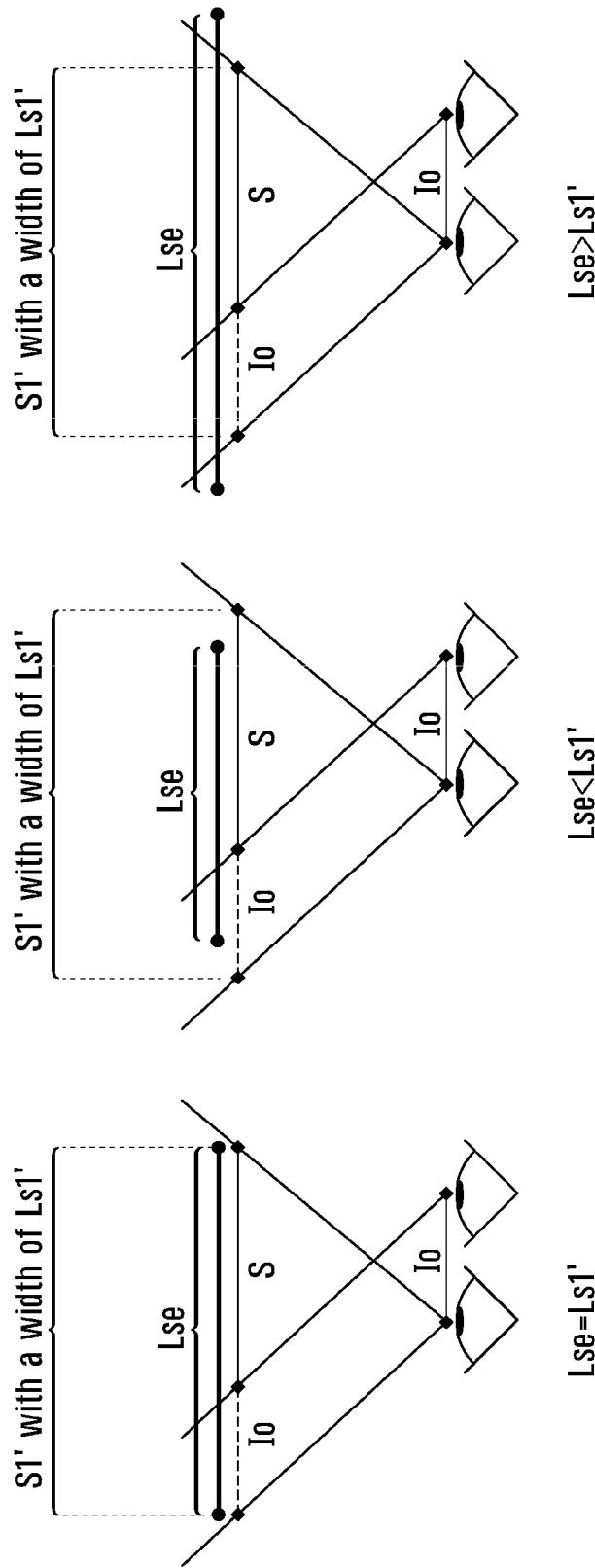

VIEWER-ADJUSTED STEREOSCOPIC IMAGE DISPLAY

CROSS-REFERENCE TO RELATED APPLICATIONS

The present patent application is a continuation application of U.S. patent application Ser. No. 17/137,833 filed Dec. 30, 2020, now allowed, which, in turn, is a continuation application of U.S. patent application Ser. No. 16/783,784 filed Feb. 6, 2020, now U.S. Pat. No. 10,917,623, which, in turn, is a continuation application of International Patent Application no. PCT/CA2018/051039 filed on Aug. 29, 2018, designating the United States and claiming priority of U.S. provisional patent application No. 62/551,942 filed on Aug. 30, 2017 and U.S. provisional patent application No. 62/627,825 filed on Feb. 8, 2018, the contents of which are hereby incorporated by reference in their entirety.

TECHNICAL FIELD

This application relates to stereoscopic image displaying.

BACKGROUND

Stereoscopic video or cinematography is an art. The arrangement of the cameras to obtain left and right video streams for playback with the best 3D effect is not a trivial task. The arrangement of the cameras requires knowledge of the cinema and viewing audience arrangement, as well as an understanding of how 3D is perceived by most people under such viewing conditions. It is generally accepted in the art of stereoscopic cinematography that two cameras are arranged with their optical axes to be convergent, as this will result in the best 3D effect. The camera separation and convergence angle is selected with knowledge of the average viewer distance from the display screen, average eye separation and average viewing position with respect to the center of the screen. If these viewing conditions are not respected, then the quality of the 3D experience is compromised.

When the viewing conditions are to be changed from the ones originally intended by the stereoscopic cinematographer, it is known in the art to reformat the stereoscopic video for the new viewing conditions. Reformatting typically involves analyzing the stereoscopic image pairs to determine the depth of individual pixels, and then generating stereoscopic image pairs using the original image and the depth information so as to be able to recreate a suitable stereoscopic image stream for the new viewing conditions. Such reformatting is computationally extensive and is performed for the new viewing conditions. When the viewing conditions change, the computationally extensive process is repeated.

SUMMARY

Applicant has discovered that any potential loss of quality in the 3D experience caused by using parallel, non-convergent cameras is overcome by the increase in quality of the 3D experience when such stereoscopic video is reformatted for the viewing conditions of the viewer on a single screen.

Accordingly, a playback device is provided that processes original stereoscopic image pairs provided for viewing under original viewing conditions by scaling and cropping to provide new viewing condition stereoscopic video on a single screen.

In order to avoid reformatting of the stereoscopic images as described above, it is possible to display stereoscopic images intended originally for display with a first field of view on a new single display having a second field of view.

Applicant has further discovered that acquiring and storing 3D images using parallel axis cameras with a wider field of view that is normally expected to be used for viewing is advantageous to be able to process the 3D images recorded at the viewing device (or within the viewing system) for viewing under a greater range of viewing conditions.

A broad aspect is a method of processing stereoscopic images for display to a viewer on a single screen, the stereoscopic images taken using parallel-axis cameras having a first field of view. The method includes using a definition of a second field of view provided by the single screen, an interocular distance Io for the viewer and a distance between the viewer and the single screen to position and to scale the stereoscopic images so that display of the images on the single screen at the distance from the viewer respects the first field of view, and when the stereoscopic images as scaled for the screen are larger than the screen, to crop the images for the screen, and when the stereoscopic images as scaled for the screen are smaller than the screen, providing a border for the images for the screen.

In some embodiments, the method may include selecting a zoom window within the stereoscopic images to thus change the first field of view, wherein the stereoscopic images may be scaled respecting the changed first field of view.

In some embodiments, the zoom window may be offset from a center of the stereoscopic images to permit viewing a region of interest within the stereoscopic images.

In some embodiments, the viewer input may be used to move the offset while viewing the stereoscopic images.

In some embodiments, the stereoscopic images may be still images.

In some embodiments, the stereoscopic images may be video images.

In some embodiments, the stereoscopic images may be converted to combined anaglyphic format images.

In some embodiments, the stereoscopic images may be converted to column interleaved format images for display on an autostereoscopic display.

In some embodiments, the stereoscopic images may be converted to a sequence of page-flip images for viewing with shutter glasses.

In some embodiments, the stereoscopic images may be converted to a sequence of line-interleaved for polarized displays.

In some embodiments, the method may include acquiring user input to obtain the definition of a second field of view provided by the single screen.

In some embodiments, the method may include acquiring sensor data to obtain the definition of a second field of view provided by the single screen.

In some embodiments, the stereoscopic images may be positioned on the single screen to correspond to an object separation of Io between right eye and left eye images for distant objects.

In some embodiments, the viewer may include a plurality of viewers, and the interocular distance Io may be selected to be a smallest interocular distance among the plurality of viewers.

In some embodiments, the stereoscopic images may be further scaled and/or positioned using a relative base offset to make the most distant objects appear closer to the screen and/or to make the closest objects appear closer to the screen. The objective is to reduce possible eye strain due to a difference in ocular accommodation for focussing on the single screen and ocular accommodation for focussing on close and/or far objects. In this further scaling and positioning of the relative base offset, it is possible to maintain objects appearing at a depth of the single screen to appear at a same depth.

Another broad aspect is a device for processing stereoscopic images for display to a viewer on a single screen, the device comprising a processor and a memory readable by the processor, the memory storing instructions for performing the method as defined herein.

Another broad aspect is a computer program product comprising a non-transitory memory storing instructions for a processor or reconfigurable hardware for performing the method as defined herein.

BRIEF DESCRIPTION OF THE DRAWINGS

The invention will be better understood by way of the following detailed description of embodiments of the invention with reference to the appended drawings, in which:

FIG. 4A is a diagram corresponding to width perception in the real world;

FIG. 4B is a diagram corresponding to width perception with monoscopic vision in the real world and the perceived world;

FIG. 8A is a diagram of dual parallel screens S1 and S2 placed before a user;

FIG. 8B is a diagram of different proportions relating to where an object Op will be perceived when a user is facing a dual screen system at a distance Ds from the eyes of viewer;

FIG. 9A is a diagram of two theoretical overlapping screens S1' and S2' situated further away from the user than the dual screens S1 and S2;

FIG. 9B is a diagram showing proportions tied to how an object Op will be perceived by the right eye on at least portions of the dual screens S1' and S2';

FIG. 14A is a diagram of an exemplary single screen system, where the width of the screen S1' is compared to the effective width of the image, where the image perceived by the left eye does not need to be adjusted because Lse=Ls1';

FIG. 14B is a diagram of an exemplary single screen system, where the width of the screen S1' is compared to the effective width of the image, where the image perceived by the left eye requires black strips to be added on both sides because Lse<Ls1';

FIG. 14C is a diagram of an exemplary single screen system, where the width of the screen S1' is compared to the effective width of the image, where the image perceived by the left eye needs to be cut because Lse>Ls1';

FIG. 15A is a diagram of an exemplary single screen system perceived by a user where Lse=Ls1';

FIG. 15B is a diagram of an exemplary single screen system perceived by a user where Lse<Ls1';

FIG. 15C is a diagram of an exemplary single screen system perceived by a user where Lse>Ls1';

| | Variables (upper ease) | Annotations (lower case) |
|---|---|---|
| CAPTURE | F = Focal | s = screen |
| | G = Magnification | se = effective image |
| | B = Base or inter-axial | on the screen |

-continued

| | Variables (upper ease) | Annotations (lower case) |
|---|---|---|
| SCREEN | S = Screen | c = camera/sensor |
| | M = Magnification | p = user perception |
| | Io = Interocular distance | img = image |
| | C = Center of the screen | g = left |
| COMMON | P = Parallax | d = right |
| | D = Distance | h = horizontal |
| | L = Width | v = vertical |
| | R = Resolution | |
| CALCULATIONS | Esp = spatial scale | |
| | Epr = depth scale | |

Figure 24B:
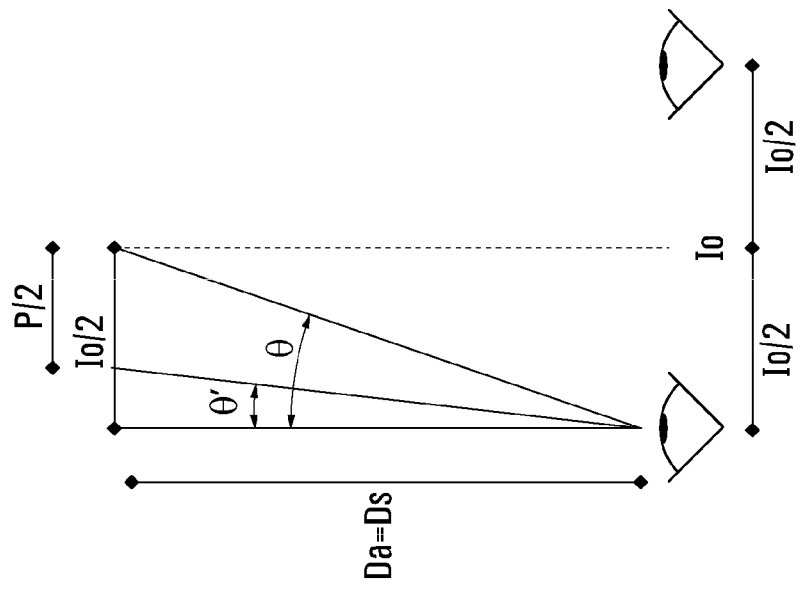
Figure 24A:
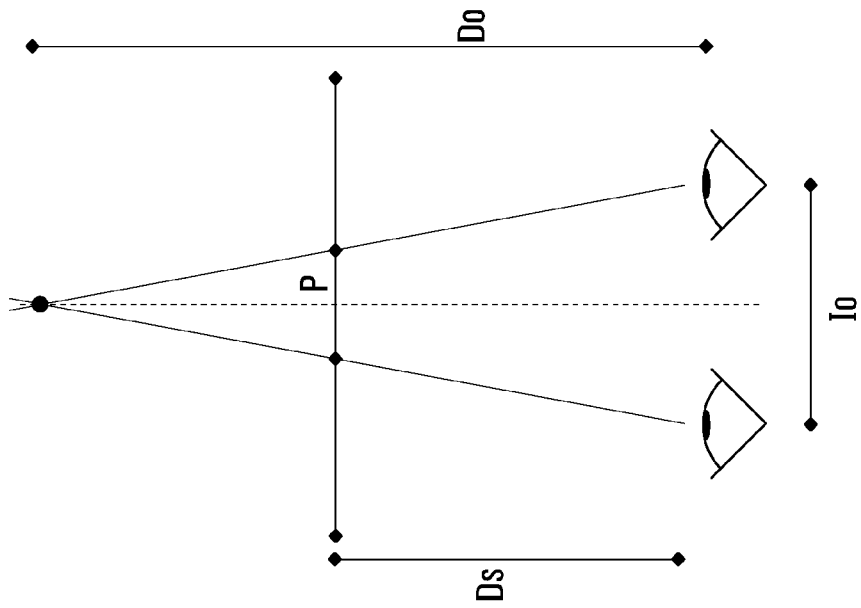
Figure 25B:
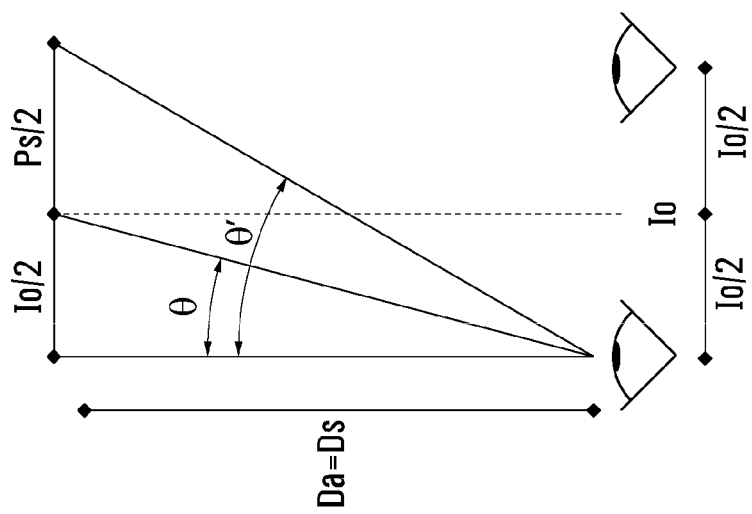
Figure 25A:
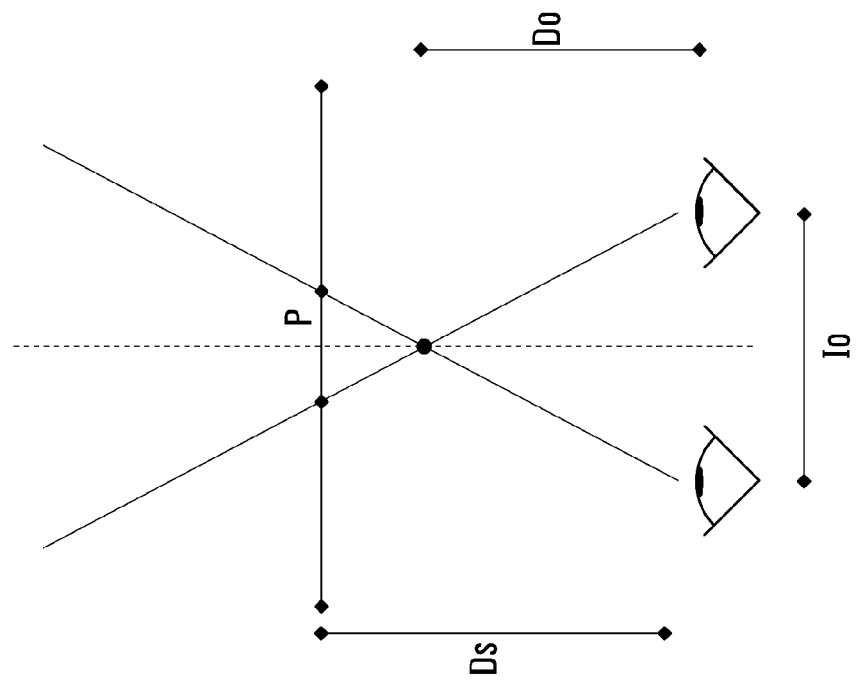

FIG. 24A is a drawing illustrating the viewing geometry for a case of convergence on behind of the screen, FIG. 24B is a drawing illustrating the geometry of the screen convergence angle and of the object convergence angle;

FIG. 25A illustrates the viewing geometry for a case of convergence in front of the screen; and FIG. 25B illustrates the geometry of the screen convergence angle and of the object convergence angle.

DETAILED DESCRIPTION

Prior to describing the geometry behind the image processing techniques involved in embodiments described herein, a qualitative overview of the image processing is presented.

Figure 1A:
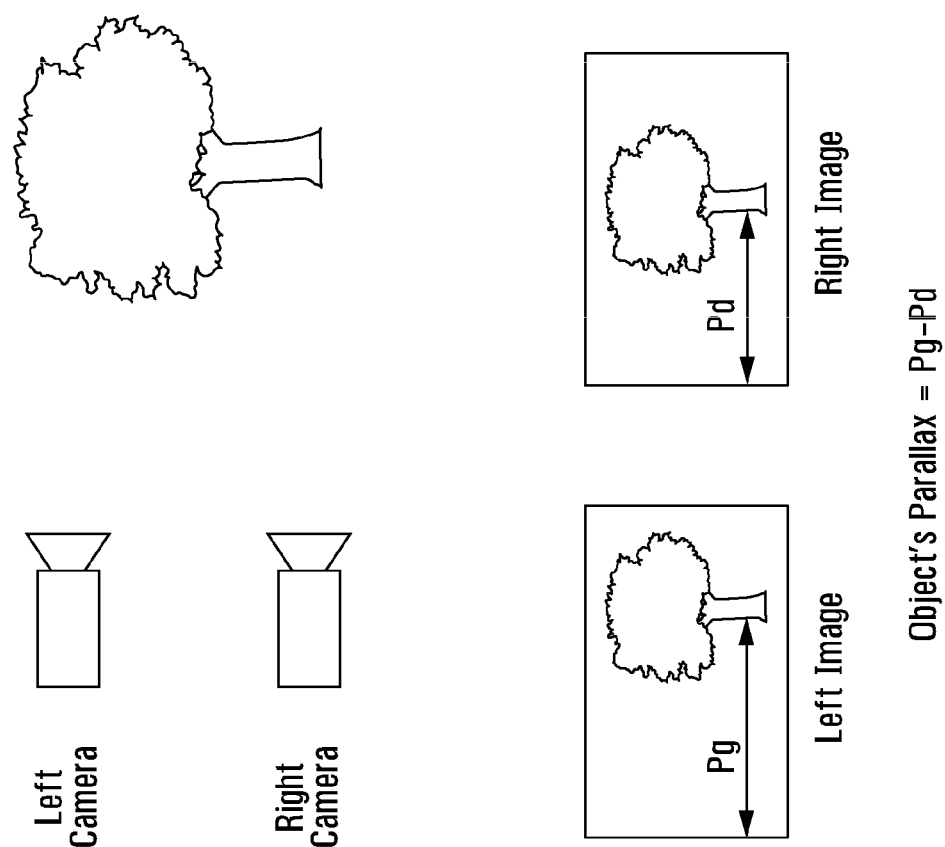
FIG. 1A is a diagram of an exemplary parallel camera system.

In FIG. 1A, there is shown schematically how parallel cameras, namely a left camera and a right camera can be arranged to capture the same scene. The two cameras can have the same properties of resolution, focus, field of view, etc., and they have parallel optical axes. The two cameras can be separated by a distance that can correspond to the separation between a viewer's eyes. Objects at infinity appear in each camera image at the same position. Closer objects will have a different parallax depending on the inter-camera distance, the position of the object within the field of view including the distance of the object from the camera.

Figure 1C:
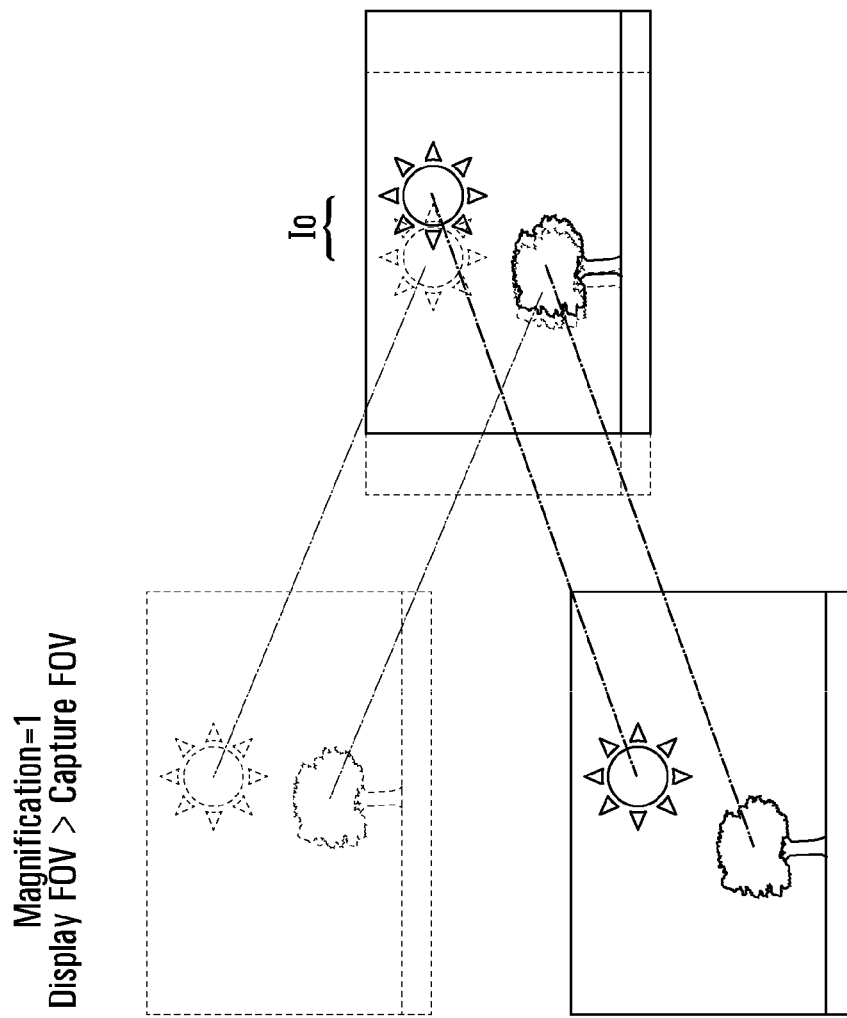
FIG. 1C is an illustration of how qualitatively each image is placed within a single screen's frame with an appropriate sideways offset to correspond the viewer's interocular distance in which the magnification is one and the display field of view is greater than the capture field of view.
Figure 1B:
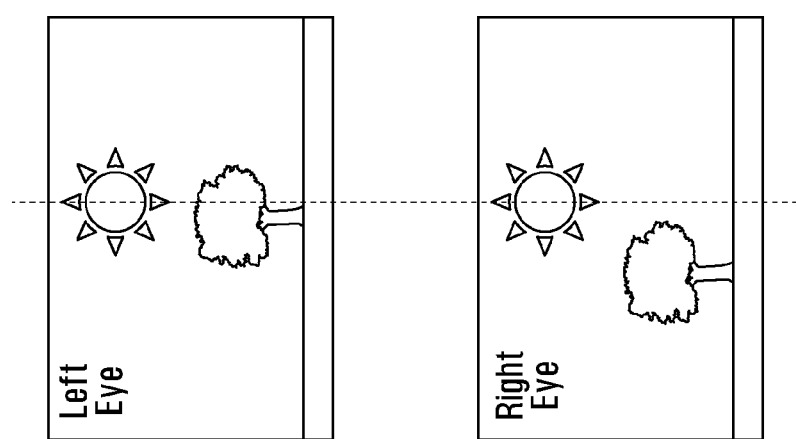
FIG. 1B is an illustration of a left camera image above a right camera image.

In FIG. 1B, there is shown a left eye image above a right eye image with the sun appearing at the same position in each image. A tree appearing in midfield will have a different position in the two images due to the parallax.

As shown in FIG. 1C, modification of the camera images of FIG. 1B is required for display on a single screen. Viewing on a single screen can be done by known techniques. For example, anaglyphic color filter glasses can be worn by the viewer and the screen image is then composed of both right and left image data that is color encoded. In page-flip operation, the viewer can wear shutter glasses that allow the right and left eyes to see in alternating time slots while the screen image alternates between right and left images. In an autostereoscopic display, the viewer does not need any glasses, but the screen includes a lens or screen mask that allows the right eye to see right eye pixels and the left eye to see left eye pixels.

The field of view (FOV) of the display screen in FIG. 1C is larger than the original FOV of the camera images. As illustrated in FIG. 1C, qualitatively each image is placed within the single screen's window or frame with an appropriate sideways offset to correspond the viewer's interocular distance. This distance can vary from person to person. As described below, when a screen is to be viewed by two viewers, it may be best to use the smallest interocular distance of the viewers to avoid discomfort for that viewer.

The images thus obtained are displayed on the single screen according to the stereoscopic display technique.

Figures 1D, 1E:
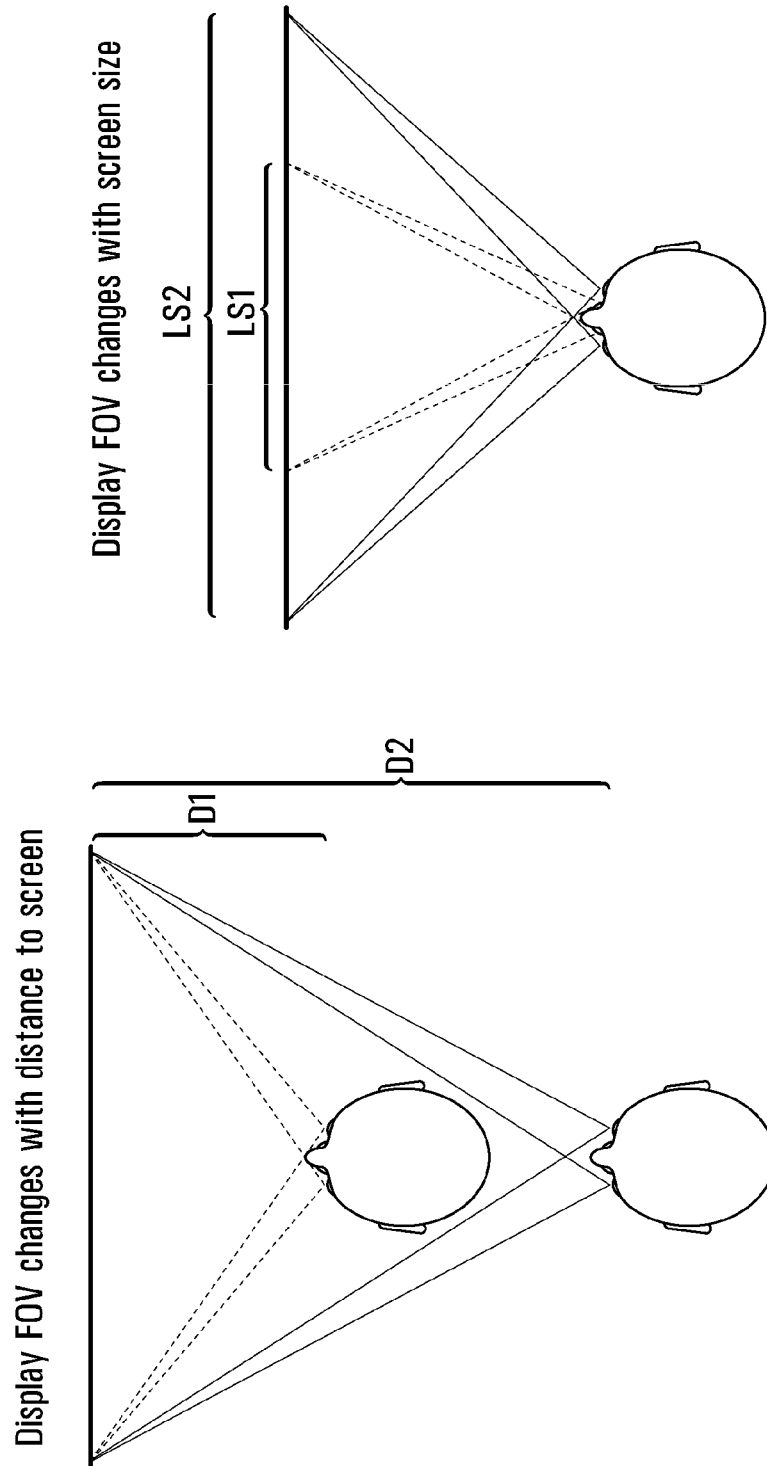
FIG. 1D illustrates schematically changes in field of view with viewing distance to a screen.
FIG. 1E illustrates schematically changes in field of view for a fixed viewing distance with changing screen size.

It will be appreciated that the FOV of the display or screen changes as illustrated in FIG. 1D as a viewer changes his or her distance from the screen. When the viewer is closer to the screen, the FOV is greater. Likewise, when a viewer is at a fixed distance from a screen, the FOV is greater with a larger screen than for a smaller screen. FIGS. 1D and 1E are important for understanding qualitatively the dependence between FOV, the viewing distance and the screen size.

Figure 1F:
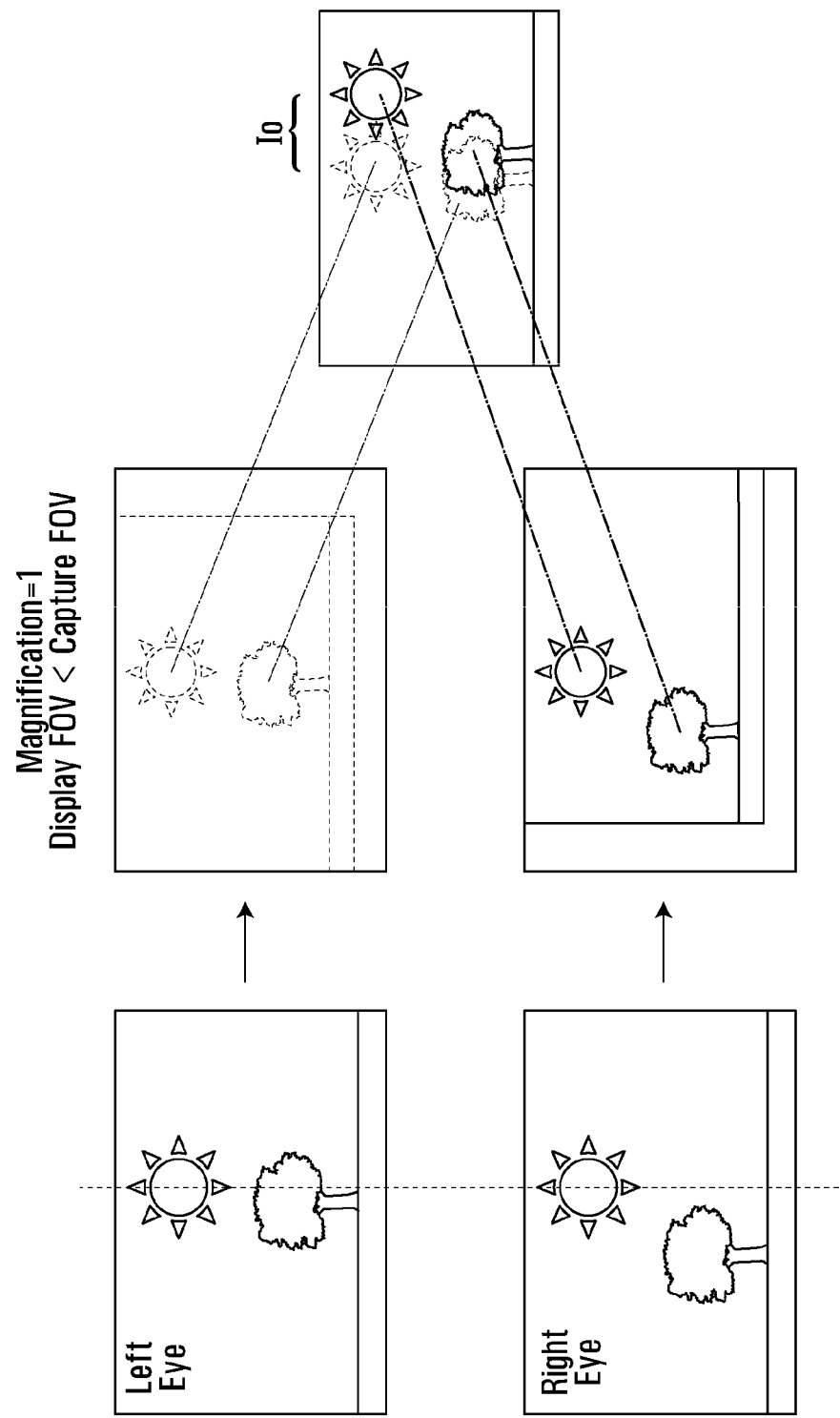
FIG. 1F is an illustration of how qualitatively each image is placed within a single screen's frame with an appropriate sideways offset to correspond the viewer's interocular distance in which the magnification is one and the display field of view is smaller than the capture field of view.

In the embodiment of FIG. 1C, the display screen provided an FOV greater than the original FOV, and thus some padding or blacking out of a border portion can be done. In the embodiment of FIG. 1F, the display FOV is smaller than the capture FOV. This means that the display screen is essentially too small for the viewing distance. As illustrated qualitatively in FIG. 1F, cropping of the original capture images is done so that the two images can be combined and fit onto the display screen. While some edge portions of the original capture images are lost, the images are stereoscopically faithful to the original capture.

Figure 1G:
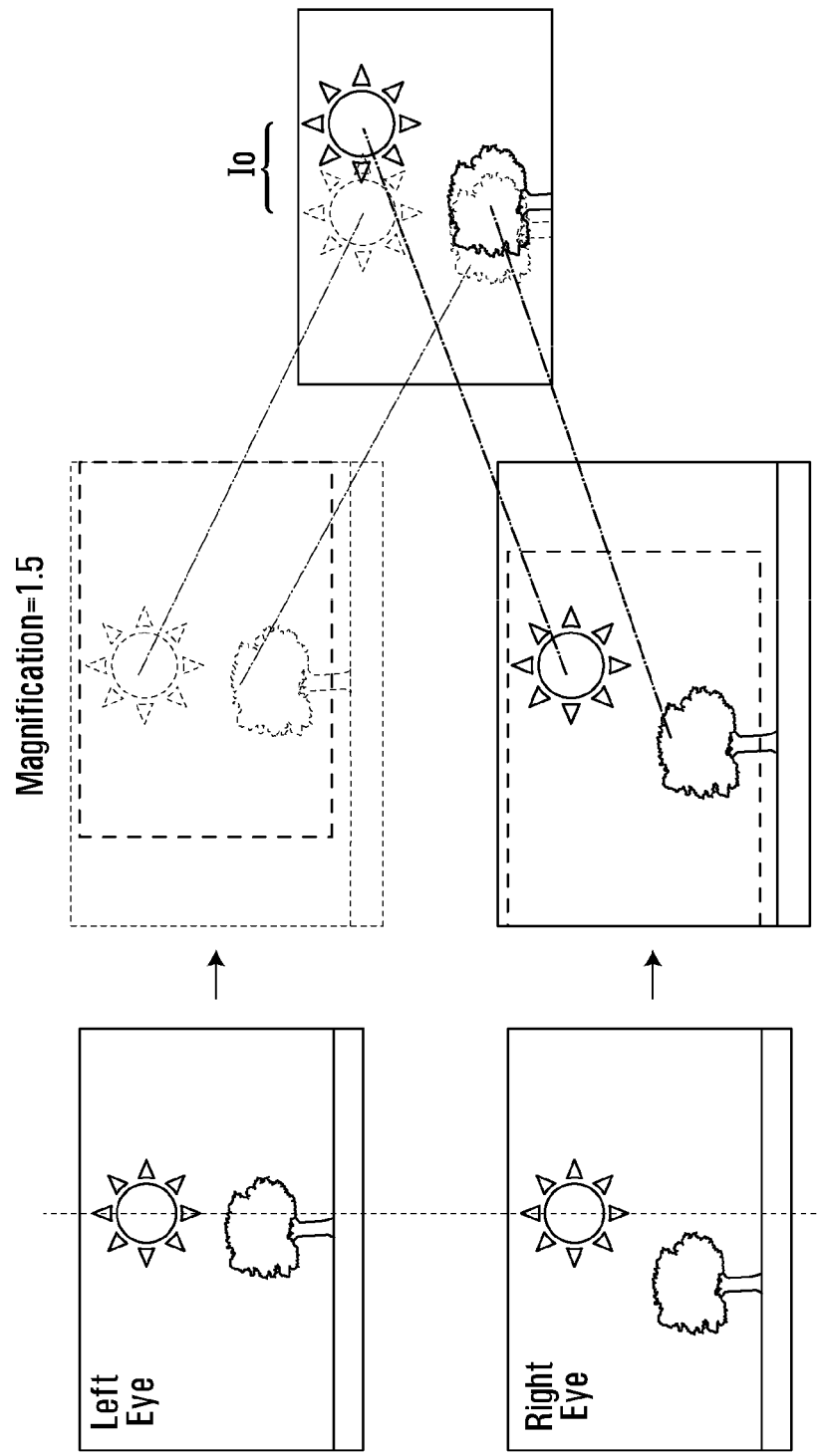
FIG. 1G is an illustration of how qualitatively each image is placed within a single screen's frame with an appropriate sideways offset to correspond the viewer's interocular distance in which the magnification is 1.5 and the display field of view is about the same as the capture field of view.

In the embodiment of FIG. 1G, the stereoscopic output is to be magnified by a factor of 1.5. Qualitatively, one can see that the images of FIG. 1B (repeated on the drawing sheet for ease of understanding) are first enlarged and from the enlarged images, a portion able to fit the display screen is extracted and placed with the suitable interocular offset (Io) in the single display screen according to the stereoscopic display technique. While the display screen FOV can be the same as the capture FOV, as a result of the magnification, a significant border portion of the capture images are lost. However, the stereoscopic effect of the magnified images is pleasant to view.

When the images are scaled in the way shown in FIG. 1G, the magnification affects the size of the objects and the perceived parallax, thus making objects seem closer, and gives the impression that the zoom involved getting closer to the objects in the images. While the perception of the depth variation among the objects in the scene is reduced or flattened, because the images remain aligned with the two eyes, the 3D effect works well in spite of the magnification.

The ability for the stereoscopic effect to withstand the adjustment to the original capture images in accordance with the variable viewing conditions is facilitated by the original capture images being from parallel axis cameras. It will be appreciated that cameras having axes that are close to parallel provides images that are suitable.

It will be appreciated that the magnification of the capture image illustrated in FIG. 1G need not be taken about the center of the capture images, and that a window of interest is effectively selected when performing such a magnification. It will further be appreciated that this feature allows a viewer to move the window of interest in a way that simulates panning of the original capture scene.

Figure 1H:
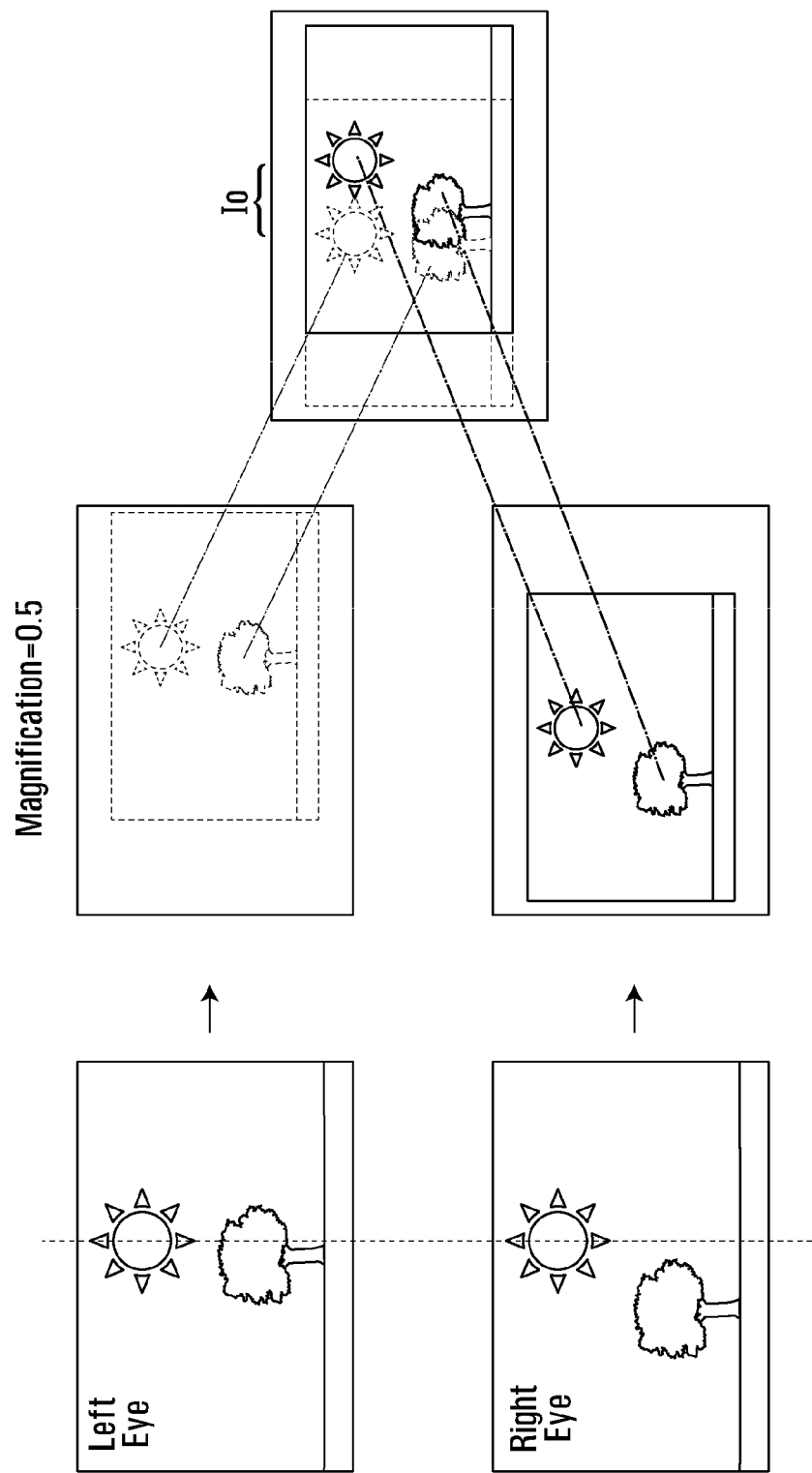
FIG. 1H is an illustration of how qualitatively each image is placed within a single screen's frame with an appropriate sideways offset to correspond the viewer's interocular distance in which the magnification is 0.5 and the display field of view is about the same as the capture field of view.

In the embodiment of FIG. 1H, the stereoscopic output is to be magnified (namely shrunk) by a factor of 0.5. Qualitatively, one can see that the images of FIG. 1B (repeated on the drawing sheet for ease of understanding) are first scaled-down and the smaller images are placed with the suitable interocular offset (Io) in the single display screen according to the stereoscopic display technique. While the display screen FOV can be the same as the capture FOV, as a result of the reduction, no portion of the capture images is lost. The magnification factor can be chosen so that the images fit exactly the available FOV of the single display screen. As before, while the perception of the depth variation among the objects in the scene is increased in the embodiment of FIG. 1H, because the images remain aligned with the two eyes, the 3D effect works well in spite of the magnification.

Having described certain embodiments qualitatively, other embodiments will be described below using exact geometry calculations.

Capture with Parallel Cameras

A stereoscopic capture system consisting of two identical cameras is arranged in a parallel configuration. As shown in FIG. 1A, the parallax of an object captured with such a stereoscopic system is the difference measured between the positioning of this object on the image picked up by the left camera and the positioning of this same object on the image captured by the camera on the right.

Figure 2:
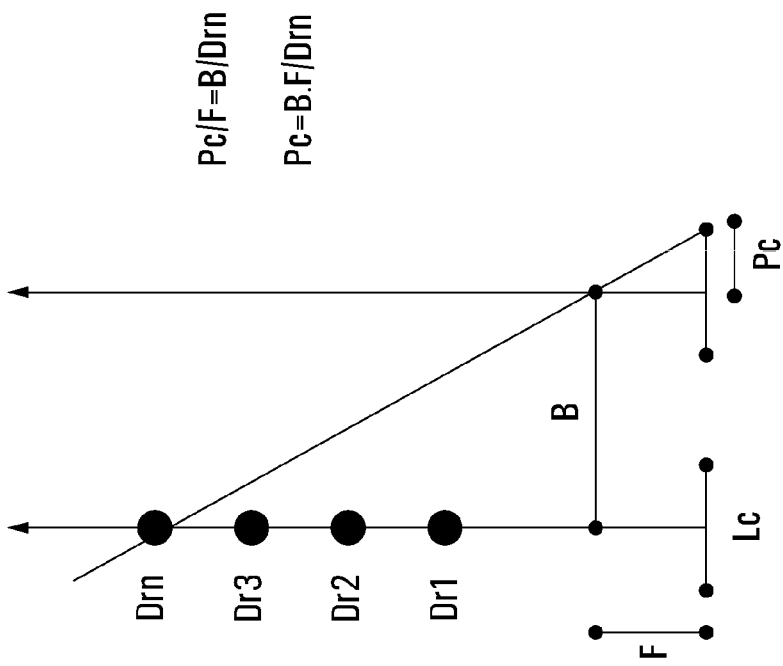
FIG. 2 is a diagram illustrating proportions tied to the calculation of the parallax of an exemplary parallel camera system.

As shown in FIG. 2, it is defined that these two cameras have sensors of width Lc and a focal length of length F. The centers of their respective lenses are placed at a distance B from each other. This distance is called the base.

When an object is exactly on the center axis of the left camera, then this object will be represented exactly at the center of the sensor on the left camera. The parallax of this object will be equal to the distance between the point formed by this object on the sensor of the camera on the right and the center of the sensor of the camera on the right, which is illustrated in the graph above by the segment pc. The parallax of an object situated at a distance Dn can be determined by comparing the equivalent right triangles where the sides Pc and B are corresponding, as well as the sides Drn and F. Pc=B*F/Drn is obtained.

Depth Scale—Parallel Screens

Figure 3B:
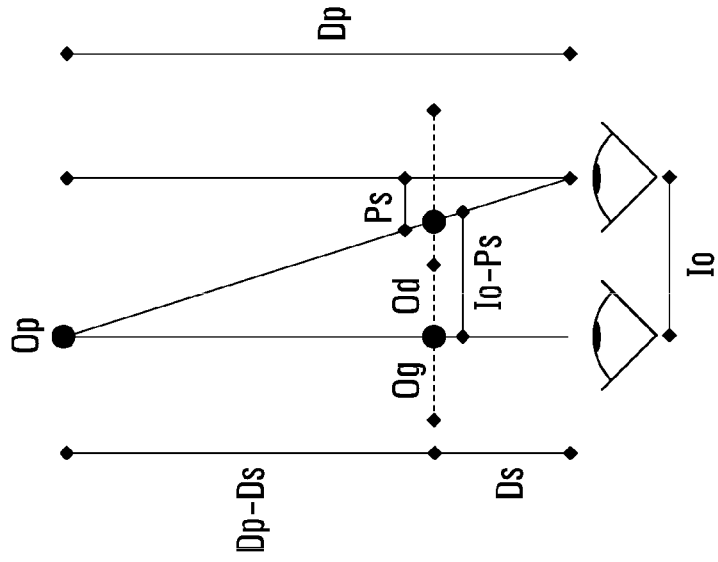
FIG. 3B is a diagram showing proportions for calculating the perceived distance of an object Op of dual parallel screens S1 and S2 placed before a user.
Figure 3A:
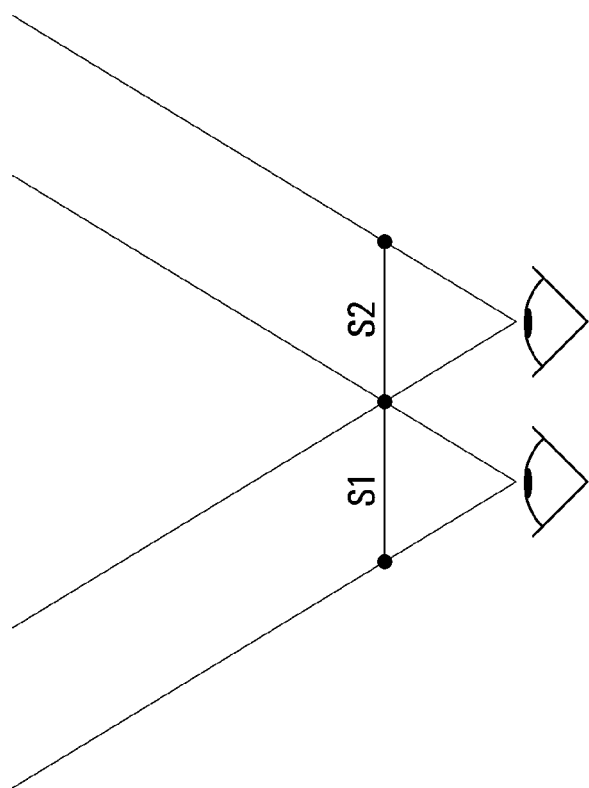
FIG. 3A is a diagram of dual parallel screens S1 and S2 placed before a user.

To view stereoscopic images, parallel screen systems can be used, where both eyes display a separate image (left and right images) on their own screen. These two screens of identical size (named S1 and S2) are aligned directly with the center of the pupil of each eye (see FIG. 3A).

Using an object whose representation on the left screen would be located in Og, directly on the axis perpendicular to the screen and passing by its center, the representation on the right screen would be located in Od or at a Distance Ps (screen parallax) from the center of the screen. The perceived distance of the object Op given by the information of disparity would thus be Dp. There are two equivalent right triangles, and by matching the sides, the following ratios are obtained:

$$\frac{Io - Ps}{Dp - Ds} = \frac{Io}{Dp}$$

The following simplification may be made:

$$Dp(Io - Ps) = Io\,(Dp - Ds)$$

$$Dp.Io - Dp.Ps = Dp.Io - Ds.Io$$

$$Dp.Ps = Ds.Io$$

$$\boxed{Dp = \frac{Ds.Io}{Ps}}$$

The parallax on the screen (Ps) can be calculated by multiplying the parallax of the sensor (Pc) by a magnification factor on the screen. This magnification factor (M) corresponds to the ratio of the effective width of the image presented on the screen (Lse) to the width of the captured image, which for all practical purposes is equal to the width of the sensor (Lc). In the present case, let us establish that the image presented on the screen is the image originally captured in its entirety. The following is obtained:

$$Ps = Pc * M$$

$$Ps = Pc * (Lse/Lc)$$

$$Ps = (B*F/Drn)*(Lse/Lc)$$

$$Ps = (B*F*Lse)/(Drn*Lc)$$

The following is obtained by combining the two preceding equations:

$$Dp = Ds * Io / Ps$$

$$Dp = Ds * Io / (B * F * Lse) * (Drn * Lc)$$

$$\boxed{Dp = \frac{Io}{B} * \frac{Ds}{Lse} * \frac{Lc}{F} * Drn}$$

For a given spectator seated at a fixed distance from a given stereoscopic screen and looking at content shot with a fixed base, it can be said that Io, B, Ds, Lse, Lc and F are constant. The equation then comes down to:

$$Dp = C * Drn$$

or $$Dp/Drn = C = Épr$$

and $$Épr = \frac{Io}{B} * \frac{Ds}{Lse} * \frac{Lc}{F}$$

In other words, the depth perception represented by the stereoscopic system is linearly proportional to that of the real world and its depth scale is equal to C. For any unitary variation of distance in the real world (capture), there will be a variation of C of the distance perceived by the observer (visualization). If:
Épr=1, then the perception of depth will be identical to that in the real world;
Épr<1, then the observer will perceive a world shallower than reality;
Épr>1, then the observer will perceive a world deeper than reality.

Spatial Scale—Parallel Screens

In order to establish the real width of an object observed in the real world, it is essential to know the relative distance. Indeed, in monoscopic vision, objects of different sizes placed at different distances could give the impression of being of the same size. This is illustrated in FIGS. 4A and 4B, where the lines Lr1, Lr2 and Lr3 are all three of different lengths but appear being of identical length for the observer who does not know the relative distances and is thus in monoscopic vision, Lp1=Lp2=Lp3.

The perceived width of an object is therefore directly related to the distance information with respect to the observer of this object.

Figure 5:
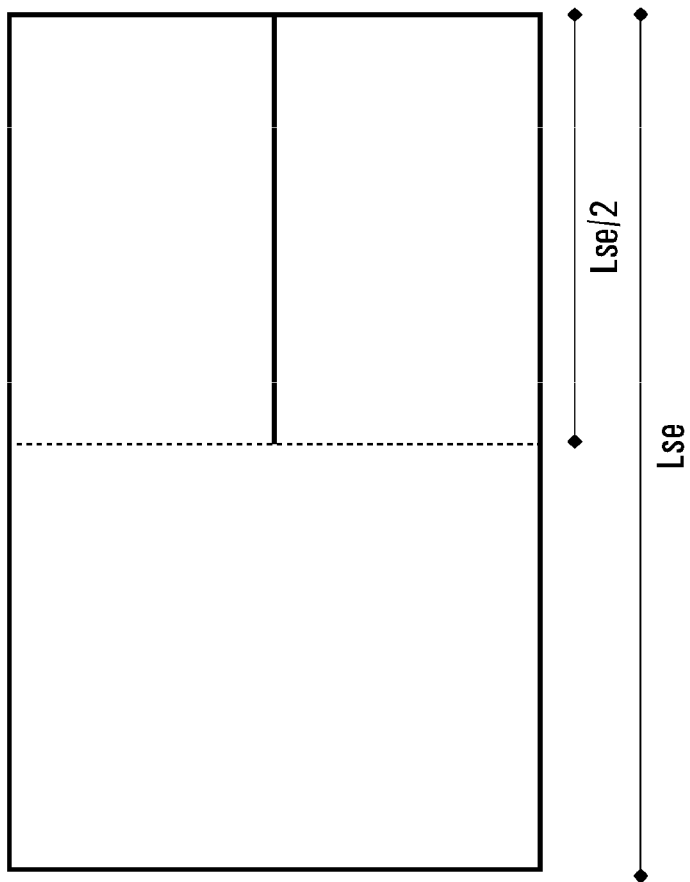
FIG. 5 is a diagram of a left eye's screen that is one of the dual screens of a stereoscopic system where a line is occupying exactly the right half of the image displayed on the screen.

As shown in FIG. 5, a stereoscopic image is taken that is displaying a line occupying exactly the right half of the image displayed on the screen of the left eye of a stereoscopic system with parallel screens. The width of this line on the screen is thus equal to Lse/2.

Figure 6B:
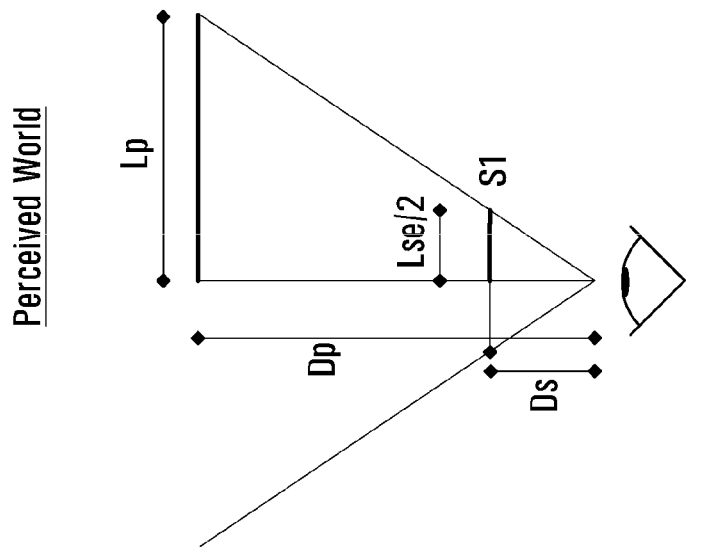
FIG. 6B is a diagram showing how an object is perceived on the left screen of a dual screen system in the perceived world.
Figure 6A:
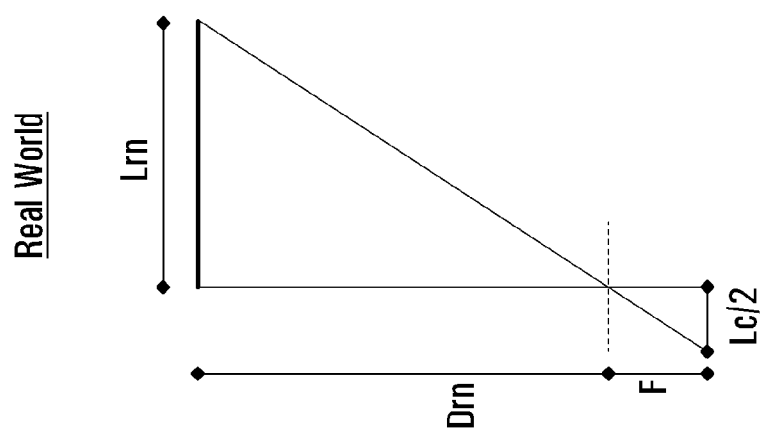
FIG. 6A is a diagram showing proportions of an object perceived in the real world at a distance Drn.
Figure 7:
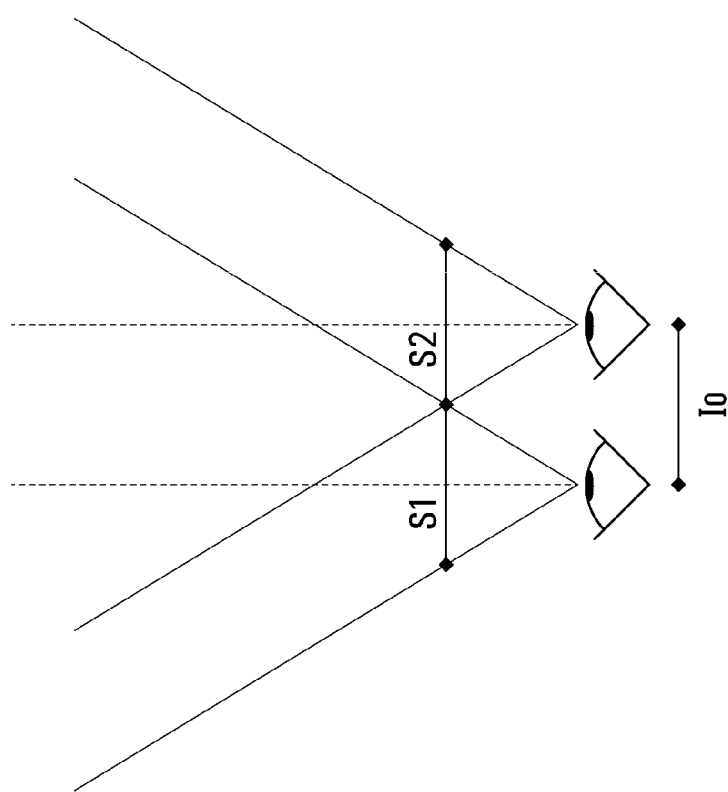
FIG. 7 is a diagram of dual screens S1 and S2 of an exemplary stereoscopic system, where S1 and S2 are perpendicular to the imaginary line Io between the right and left eye, and S1 and S2 are centered on the pupil of the left eye and the right eye respectively.

In stereoscopy, this line may be at an apparent distance different from the distance separating the observer from the screen. As shown in FIGS. 6A and 6B, it can be assumed that this line is perceived at a distance Dp from the observer. At this perceived distance, the line will have a perceived width of Lp. In other words, it will be perceived that this line is much wider because it is located much further.

As there are two equivalent right triangles, it may be established:

$$\frac{Lp}{Dp} = \frac{Lse/2}{Ds}$$

ou $$Lp = \frac{Lse * Dp}{2 * Ds}$$

It was shown above how to calculate the perceived depth (Dp) of an object in such a stereoscopic system, and by substituting this calculation for the term Dp in the equation above, the following is obtained:

$$Lp = \frac{Lse}{2 * Ds} * \frac{Io}{B} * \frac{Ds}{Lse} * \frac{Lc}{F} * Drn$$

$$\boxed{Lp = \frac{Io}{B} * \frac{Lc}{F} * \frac{Drn}{2}}$$

Now, the width of the line in the real world (Lrn) can be determined that formed the line on the image of the left eye of perceived width Lp. As this line completely occupies the right part of the image of the left eye, it can be established that it occupies entirely half of the sensor of the camera having captured this image as presented in the graph on the previous page. It can be established, by applying Thales' theorem, that:

$$\frac{Lrn}{Drn} = \frac{Lc/2}{F}$$

or $$Lrn = \frac{Lc * Drn}{2 * F}$$

It can be established that the scale ratio between the perceived width of this line and any object in the perceived world (Lp) and their real world equivalent (Ln) is as follows:

$$\frac{Lp}{Lrn} = \frac{Io}{B} * \frac{Lc}{F} * \frac{Drn}{2} * \frac{2 * F}{Lc * Drn}$$

$$\frac{Lp}{Ln} = \frac{Io}{B}$$

$$\boxed{Ésp = \frac{Io}{B}}$$

In other words, the width perception represented by the stereoscopic system is linearly proportional to that of the real world and its spatial scale is equal to Io/B. For each variation of width in the real world (capture), there will be a variation of Io/B of the width perceived by the observer (visualization). If:

Esp=1, then the perception of width will be identical to that in the real world;

Esp<1, then the observer will perceive a world narrower than reality (i.e. squeezed);

Esp>1, then the observer will perceive a wider world than reality (expanded).

Proportionality of the Stereoscopic Representations

By knowing the depth and spatial scales of stereoscopic representations, a scale of proportionality of this representation can be established. This scale of proportionality aims to determine whether the representation will be flattened, lengthened or proportional to reality. The proportion ratio is established as follows:

$$Z = \acute{E}pr/\acute{E}sp$$

If:

Z=1, then the observer will perceive a proportioned world (desired);

Z<1, then the observer will perceive a flattened world (more comfortable, less effect);

Z>1, then the observer will perceive a stretched world (more expansive, more spectacular)

For Z to equal 1, Épr=Ésp and therefore:

$$\frac{Io}{B} * \frac{Ds}{Lse} * \frac{Lc}{F} = \frac{Io}{B}$$

THEREFORE $$\boxed{\frac{Ds}{Lse} = \frac{F}{Lc}} \text{ AND Global scale} = Io/B$$

In other words, the captured field given by the Focal and Sensor pair are equal to the field of view of the stereoscopic system given by the image width (screen) and image distance pair. Any system with screens parallel to the Ds/Lse proportions, regardless of their size, will provide an equally equivalent experience, the proportion of which will be given by Io/B (from ant to giant). For example, a stereoscopic image captured for screens with a width of 10 m with an observer placed at a distance of 30 m from the screen (Ds/Lse=3) will give an identical stereoscopic experience on 10 cm screens placed at 30 cm from the screen (Ds/Lse=3).

However, there is a problem tied to the fact that beyond a certain size (wider than Io), the parallel screens will touch each other. Unless using magnifying lenses, such as stereoscopes or virtual reality headsets, the use of parallel displays is impractical, which greatly limits their use. The next section explains how to bypass this limitation and use the parallel cameras method for representations on much larger single screens such as 3DTVs or movie screens.

Conversion for Single Screens

The equations developed above work only for parallel screens, that is to say for screens perpendicular to the imaginary line separating the two eyes and whose centers are located exactly in the center of the pupil of each eye.

It has been demonstrated above that stereoscopic representations with systems with the same Ds/Lse ratio (the ratio of the distance to the screen over the width of the image presented on the screen) would provide an experience in all regards identical, that is to say that the perceived size and distance of the objects would be perfectly identical.

As shown in FIGS. 8A and 8B, an Op object whose perceived distance is Dp is taken. This point would be represented on the screen of the left eye (S1) by the point Og and in the screen of the right eye (S2) by the point Od. The point Og is located exactly on the central axis of the screen S1 while the point Od is situated at a distance Ps from the center of the screen S2. The two eyes thus converge at the point Op which will be the place where the observer will perceive that this point is localized as illustrated in FIG. 8B.

As shown in FIGS. 9A and 9B, two theoretical screens S1'and ST which have the same ratio Ds/Lse as the screens S1 and S2 and which are situated farther away from the screens are taken. These screens are theoretical since they overlap, which is not possible in the real world. It is therefore known that Ls1/Ds1 is equal to Ls2/D2 which are also equal to Ls1'/Ds1' and Ls2'/Ds2'. Since the screens S1 and S1' are centered on the pupil of the left eye, it can be asserted that the points Og and Og' will both be located on the central axis of their respective screens S1 and S1'. The points Od and Od' will be respectively located at a distance Ps and Ps' from the center of the screen S2 and S2' as illustrated in FIGS. 9A and 9B.

For the point Op to be perceived at the same place in the two representations, the points Od and Od' form the same angle or that the ratio Ps/Ds2 are equal to Ps'/Ds2'. It Is known that as S2' is a linear magnification of S2, Ps' will undergo the same magnification in comparison with Ps. In other words, Ls2'/Ls2=Ps'/Ps. It is also known that Ls2'/Ds2'=Ls2/Ds2 since the system was designed on the basis of this constraint. So it can be deduced that:

$$Ls2'/Ds2'=Ls2/Ds2$$

Thus $$Ls2'/Ls2=Ds2'/Ds2$$

So i $Ls2'/Ls2=Ps2'/Ps2$

And $$Ps2'/Ds2'=Ps2/Ds2$$

The Op object will therefore be perceived in the same place when using either of these two systems. It has been therefore demonstrated that the two systems will offer an identical and equivalent stereoscopic experience in all regards.

Figure 9C:
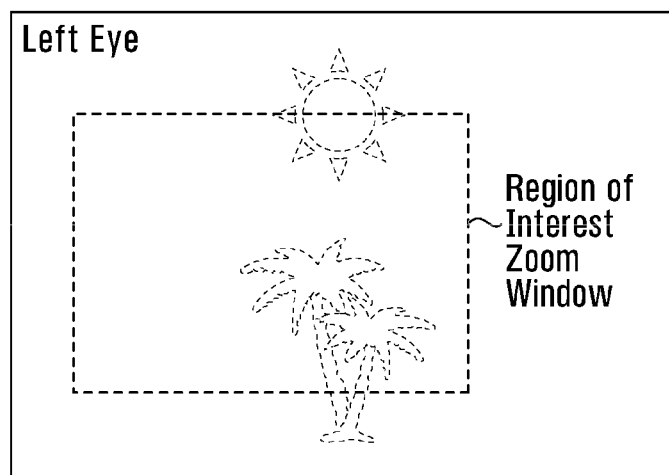
FIG. 9C is a schematic image from a left eye camera including a distant sun near the optical axis and midfield tree along the optical axis.
Figure 9D:
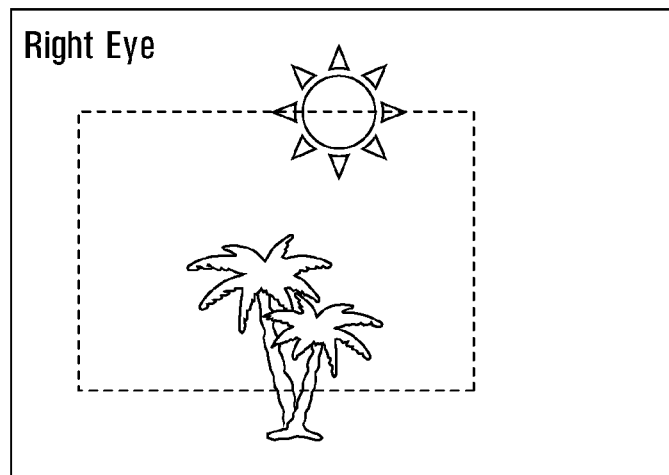
FIG. 9D is a schematic image from a right eye camera having a parallel axis to the optical axis of the left eye camera, thus showing a distant sun in vertical alignment with the optical axis and the midfield tree offset to the left.

As shown in FIGS. 9C and 9D, the images captured using parallel axis cameras have distant objects, like that of the sun, at the same position, while closer objects are in different positions. Such images can be viewed using a head-mounted display.

It will be appreciated from FIG. 9B that the image seen from each eye can be sized or scaled to fit a screen placed at a first depth corresponding to where objects Od and Og are found or to fit a screen placed at a second depth corresponding to where objects Od' and Og' are found. Thus, a small screen used at the first depth can be replaced by a larger screen at the second depth that provides the same field of view. The scaling of the image for the larger screen may cause Od to change to Od', however, the stereoscopic position of object Op does not change.

As will be understood from the description with reference to FIGS. 10 to 13 below, the images of FIGS. 9C and 9D can be scaled as a function of screen position as described above, however, the scaling of images 10C and 10D adversely affects the interocular distance, and thus any scaling also requires a position offset (or maintaining the position of the left-eye axis and right-eye axis during the scaling process) to maintain the interocular distance.

If a different screen size is desired at either of the two depths, scaling of the images changes the field of view. With monocular viewing, viewing is generally more appreciated when a normal field of view is provided, and the resolution is of good quality. Nonetheless, a viewer can sit closer or farther away from a screen, or change a 30" screen for a 50" screen at the same viewing distance, and the ability to see the monocular image is not adversely affected by changing the field of view of the original image. With stereoscopic viewing, changing the field of view will degrade the perception of stereoscopic depth of the objects.

For example, with reference to FIG. 9B, if the image presented to the right eye were presented on a larger screen at the second depth, Od' would appear further to the left as a result of the scaling to fit the larger screen at the same second depth. Because the object Og' will remain at the same central position within the left eye image, the depth of object Op will thus appear closer. This would create a distortion of the stereoscopic viewing.

If indeed a larger screen is to be used at the second depth, the larger screen can be used to display the same field of view image without adversely affecting the stereoscopy. This can involve providing a border around the images on the screen. The effective field of view is not changed.

If a smaller screen is to be used at the second depth, the smaller screen can be used to display a portion of the image. This is like looking at the world through a smaller window in the sense that the objects seen on the smaller display are the same size as the objects seen on the larger display, while only a portion of the original field of view is seen on the smaller screen. When the smaller screen has the same resolution as a larger screen, the image will be magnified and cropped so as to maintain the same object sizes and to display the portion of the image. The edges of the original images will be lost, however, the stereoscopic effect will not be distorted due to the use of the smaller screen at the second depth.

Figure 11B:
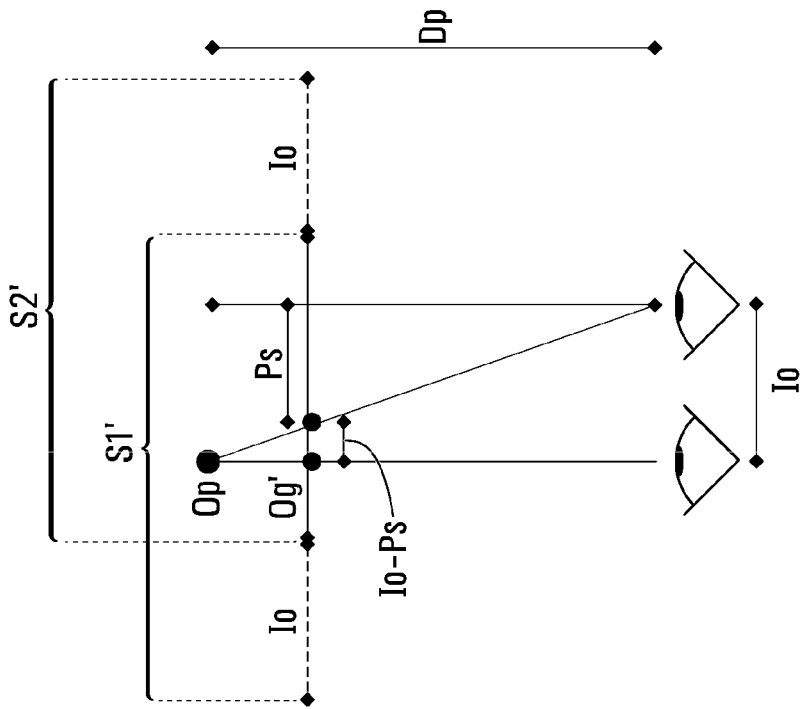
FIG. 11B is a diagram illustrating measurements of a simple screen system corresponding to portions of the screens S1' and S2' that are shared by both eyes.
Figure 11A:
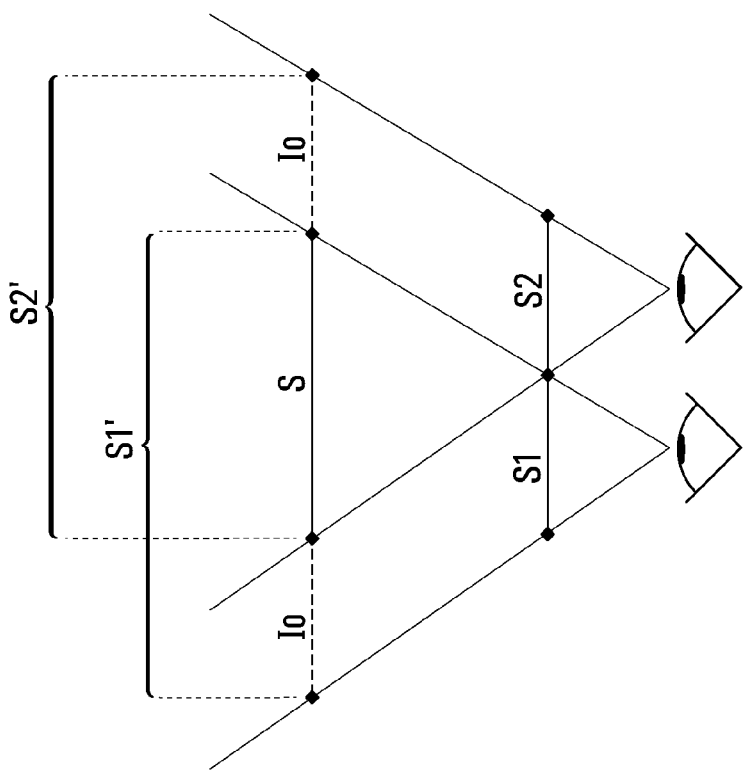
FIG. 11A is a diagram illustrating a simple screen system where portions of the screens S1' and S2' are shared by both eyes.

Now that this equivalence has been established, it can now be transposed to a stereoscopic system based on a single screen as shown in FIGS. 11A and 11B. To do this, a single screen such as two partial sections of two separate screens and centered on each pupil as shown in FIGS. 11A and 11B is considered. Indeed, a screen S is taken whose center is located on the axis perpendicular to the two eyes of an observer and in the center of them. It can be said that this screen is the partial representation of the screen S1' (right part) as well as of the screen ST (left-hand part) and that the field of vision for each eye is asymmetrical (wider-on one side than the other from the center of each eye).

Figure 10B:
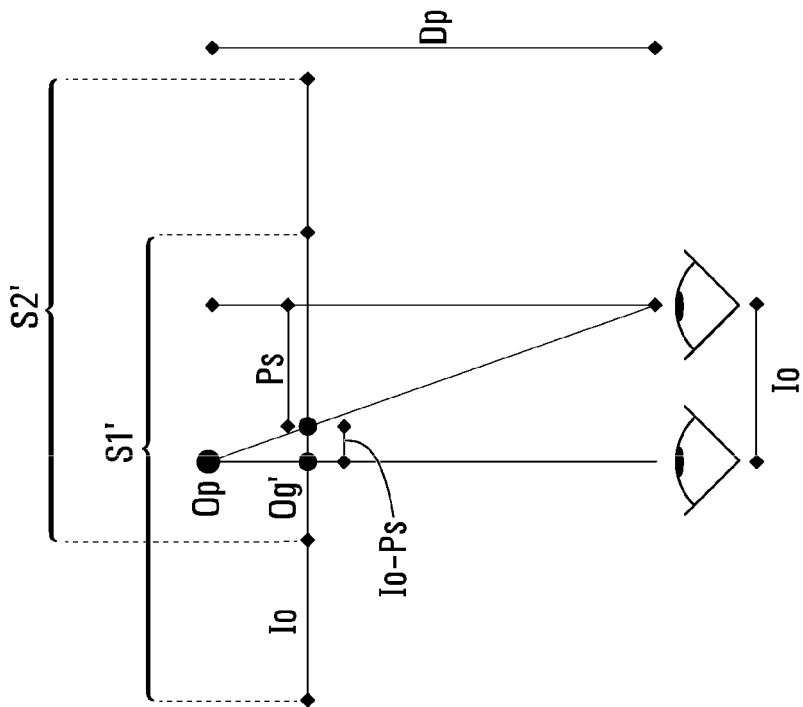
FIG. 10B is a diagram showing different measurements tied to how an object Op will be perceived by the user on the single screen with two overlapping sections S1' and S2'.
Figure 10A:
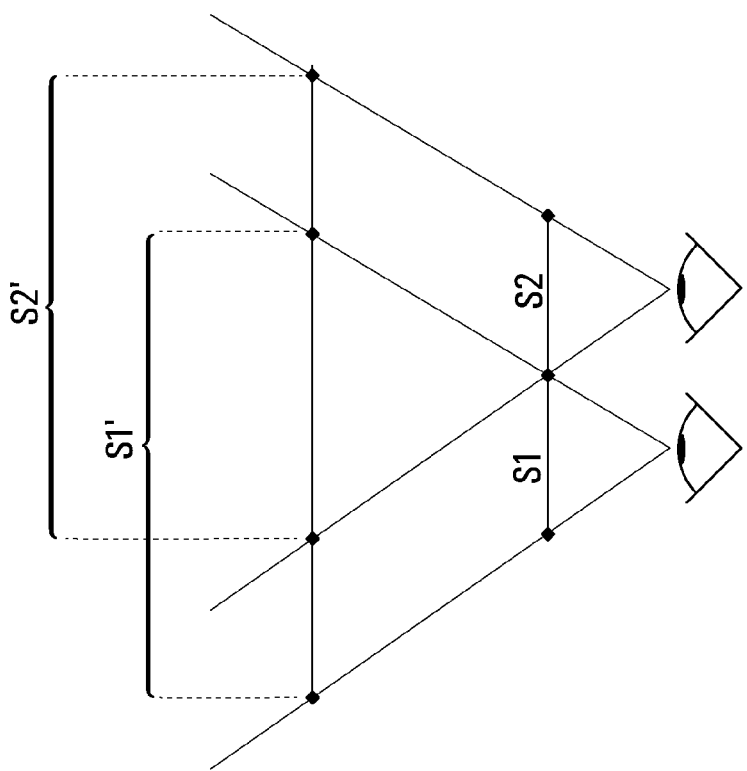
FIG. 10A is a diagram of a single screen with two overlapping sections S1' and S2' situated further away from the user than dual screens S1 and S2.
Figure 10C:
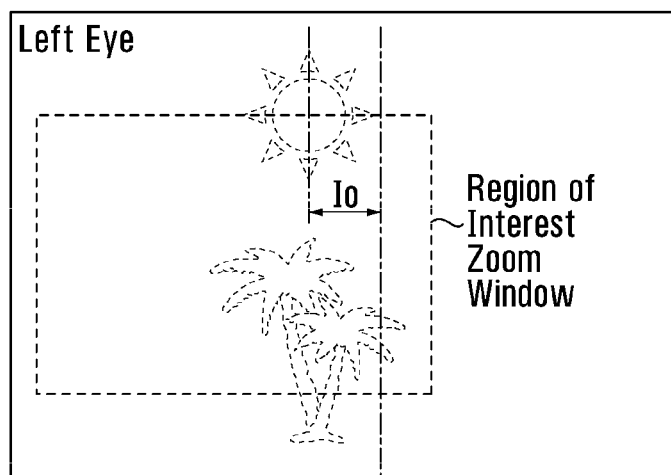
FIG. 10C is a schematic left eye image for display on a common screen, the image corresponding to the camera image of FIG. 9C with the interocular offset Io/2 to the left included in the display image, the image showing the distant sun in vertical alignment with the optical axis and the midfield tree in vertical alignment with the optical axis of the left eye.
Figure 10D:
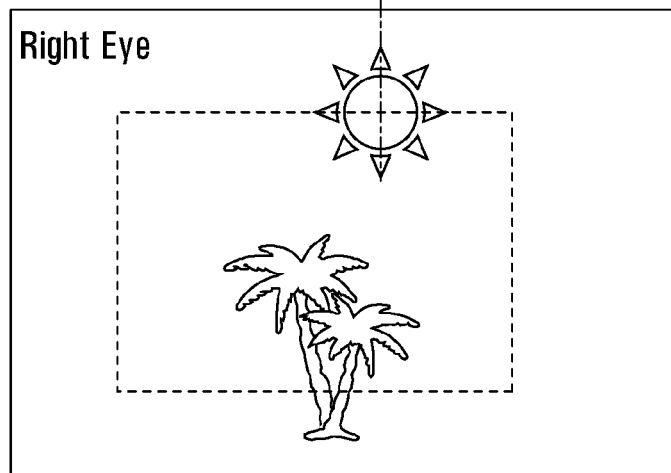
FIG. 10D is a schematic right eye image for display on a common screen, the image corresponding to the camera image of FIG. 9D with the interocular offset Io/2 to the right included in the display image, the image showing the distant sun in vertical alignment with the optical axis and the midfield tree offset to the left of the optical axis of the right eye, the interocular distance Io being shown between the distant sun objects in the images of FIGS. 10C and 10D.

As shown in FIGS. 10C and 10D, when images are to be seen dichoptically on a same display, for example using anaglyphic glasses to view an anaglyphic image (e.g. cyan for the right eye and red for the left eye), LC shutter glasses to view alternatingly presented left-eye and right-eye images, or an autostereoscopic display, the images contain distant objects with a disparity of Io. The images captured using parallel axis cameras have distant objects, like that of the sun, at the same position once the offset Io is taken into account, while closer objects are in respectively different positions with respect to the distance objects.

It will be appreciated that the scaling of the stereoscopic images taken with a camera for a first field of view for display on a screen for a viewer having a second field of view is not limited to displaying the entirety of the stereoscopic images. As shown in FIGS. 9C, 9D, 10C and 10D, a region of interest zoom window can be selected within the source stereoscopic images. This window provides a smaller first field of view than the whole source image, however, the window can then be taken as the source image and displayed as set out herein. The result of selecting a window can be that there is less cropping of the images to fit the new screen.

This window selection need not be at the center of the images, and is illustrated to be somewhat to the left of the images in the Figures. This window selection can be controlled by user input to allow for navigation of the direction of looking at the window within the source images.

Thus, the source images can be wide angle or panoramic scenes, and the window selection can allow the viewer to explore the scenes by changing the direction of viewing within the scenes.

Figure 12B:
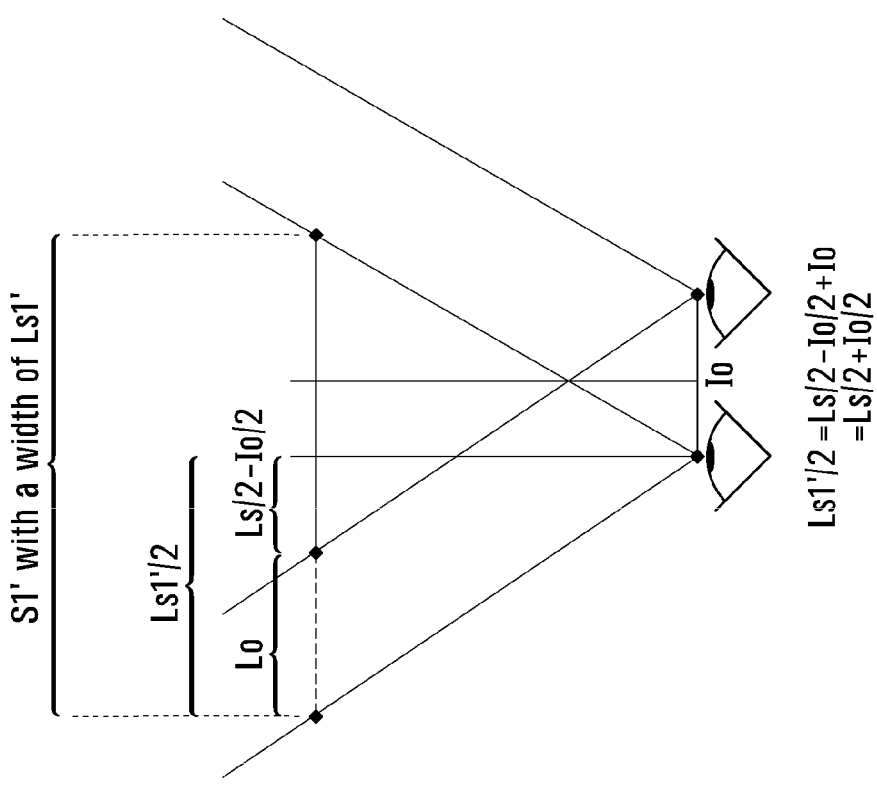
FIG. 12B is a diagram illustrating a partial image of the image intended for the right eye by using a simple screen having the same ratio Ds/Ls1' as the dual screen system.
Figure 12A:
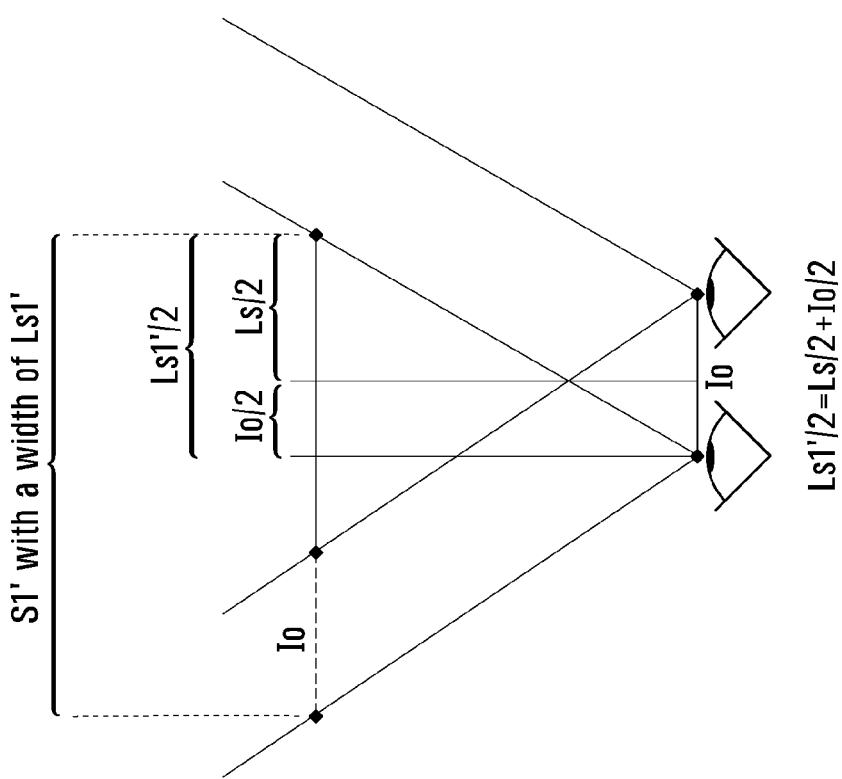
FIG. 12A is a diagram illustrating a partial image of the image intended for the left eye by using a simple screen having the same ratio Ds/Ls1' as the dual screen system.

As illustrated in FIGS. 12A and 12B, to obtain an experience equivalent to that of a parallel screen system by using a single screen having the same ratio Ds/Ls1', a partial image of the image intended for the left eye (right part) and a partial image of the image for the right eye (left part) are presented, the partial images calculated in the following way.

For the left eye, the right half of the width of the screen S1' is equal to the width of the screen divided by two (Ls/2) plus the interocular distance divided by two (Io/2) as shown in FIGS. 12A and 12B. The complete screen width S1' is thus equal to Ls/2+Io/2 multiplied by two, which gives Ls1'=Ls+Io. Since only the right-hand part of the image of the left eye can be displayed on the screen (Ls1'-Io), a part of the left image equivalent to Io is cut. The image is cut according to the proportion Io/Ls1'or Io/(Ls+Io).

Consider, for example, a 1920×1080 resolution image that should be presented on a 140 cm wide screen, with the observer having an interocular distance of 6.5 cm. The left portion of the image for the left eye should be cut by 85 pixels:

$$Io/(Ls+Io)*Rimg\_h$$

6.5 cm/(140 cm+6.5 cm)*1920 pixels=85.1877 pixels

To maintain the aspect ratio of the original image, the image is cut in the vertical axis by the same proportion either:

$$Io/(Ls+Io)*Rimg\_v$$

6.5 cm/(140 cm+6.5 cm)*1080 pixels=47.9181 pixels

Figure 13:
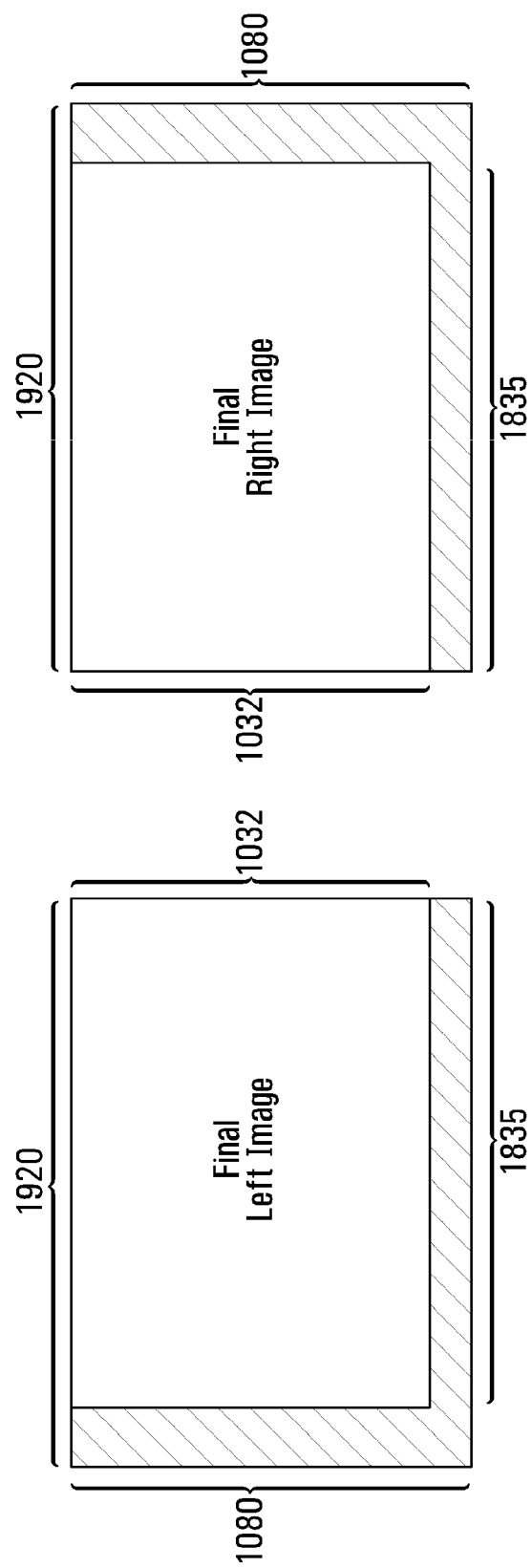
FIG. 13 is a diagram illustrating the section of the original image that will be viewed as the left eye final image and the right eye final image.

As shown in FIG. 13, the final image for the left eye will therefore be a section of the original 1835×1032 image. It should be noted that the vertical portion of the image can be any part of the image (top, bottom, center, etc.) as long as you respect the number of pixels and take the same selection for both eyes (stereoscopic alignment). To obtain the image of the right eye, simply take the equivalent left section of the original image of the right eye either a section of 1835×1032 with the same vertical alignment as the section of the eye left.

These images can then be brought back to the resolution of the screen on which they will be displayed without having any impact on the final stereoscopic result. The formulas for obtaining the final horizontal and vertical resolutions of the image are thus:

$$Rimg\_h'=Rimg\_h*(1-Io/(Io+Ls))$$

$$Rimg\_v'=Rimg\_h*(1-Io/(Io+Ls))$$

This method therefore makes it possible to use capture systems with parallel cameras for display with simple screens such as 3D televisions or 3D cinema screens with a user experience that is equivalent in every respect.

Adaptations for Non-identical Ds/L and F/Lc Ratios

It has been established above that it is possible to obtain a stereoscopic experience proportional to reality (Z=1) when the ratio Ds/Lse is identical to the ratio F/Lc. However, there may be constraints in the stereoscopic display system that may make it impossible to meet this ratio. It is nevertheless possible to modify the images so as to recover this ratio and the desired stereoscopic proportionality. For purposes of simplicity, a parallel screen system is used. A virtual reality headpiece is provided to a user with a very wide field of view thanks to magnifying lenses. The final screen width is given by the formula Ls1'=Ls1*G, where G represents the magnification provided by the lens used.

STEP 1: Determining the effective width

The effective width of the stereoscopic image is determined by considering the distance from the observer to the screen. For this purpose, the following formula is used:

$$F/Lc=Ds/Lse$$

So $$Lse=Ds*Lc/F$$

STEP 2: Comparing:

The width of the screen S1' is then be compared with the effective width of the image. As shown in FIGS. 14A, 14B and 14C, if:

Lse=Ls1', then the image can be displayed as it is on the screen;
Lse<Ls1', then reduce the size of the image (black bars, centered window);
Lse>Ls1', then you have to cut the image to respect the actual size of the screen.

STEP 3(A): Adjusting the image when Lse<Ls1'

METHOD 1:

In this case, black bands can be added all around the image to keep the image centered on the eye and to retain the original aspect ratio of the image. To do this, the following formulas are used:

$$Rimg\_h'=Ls1'/Lse*Rimg\_h$$

$$Rimg\_h'-Rimg\_h=Rimg\_h*(Ls1'/Lse-1)$$

$(Rimg\_h'-Rimg\_h)/2=Rimg\_h/2*(Ls1'/Lse-1)$: horizontal black bands

AND $$Rimg\_v'=Ls1'/Lse*Rimg\_v$$

$(Rimg\_v'-Rimg\_v)/2=Rimg\_v/2*(Ls1'/Lse-1)$: vertical black bands

The resulting image is then reset to the screen resolution to be displayed in full screen mode. For example, with an image of resolution 1920×1080, the effective width (Lse) should be 45 cm and is presented on a screen whose final width (Ls1') is 60 cm. An image may be as follows:

$$Rimg\_h'=60\ cm/45\ cm*1920\ pixels=2560\ pixels$$

$(Rimg\_h'-Rimg\_h)/2=320$ nlack pixels to be added on each side $$Rimg\_v'=60\ cm/45\ cm*1080\ pixels=1440\ pixels$$

$(Rimg\_v'-Rimg\_v)/2=180$ pixels to add vertically at the top and bottom of the image The final image will therefore have a resolution of 2560×1440 pixels with a preserved aspect ratio of 1.78:1. This new image can then be reset to the screen resolution to display in full screen mode. For example, if the screen had a resolution of 800 pixels, then the active part (displaying image data) would be 1920/2560*800=600 pixels.

METHOD 2:

Alternatively, an image can be created that would be presented in a window centered horizontally in the screen, preferably vertically centered as well. The image has the following resolution:

$$Rimg\_h'=Lse/Ls1'*Rs\_h$$

$$Rimg\_v'=Rimg\_v*Rimg\_h'/Rimg\_h$$

Taking the same example as earlier with a 45 cm Lse, a 60 cm Ls1, a horizontal image resolution of 1920 pixels and a screen of 800 pixels wide. Therefore:

$$Rimg\_h'=45\ cm/60\ cm*800\ pixels=600\ pixels$$

The image (downscale) is reduced from 1920 pixels to 600 pixels and to center it in the screen which gives exactly the same result as above (active part of the image).

STEP 3(B): Image adjustment when Lse>Ls1'

When the effective width of the image is greater than the effective width of the screen, the image is reduced by cutting also on each side of the image to maintain the horizontal centering. The following method can be used:

$$Rimg\_h'=Rimg\_h/Lse*Ls1'$$

$$Rimg\_h-Rimg\_h'=Rimg\_h*(1-Ls1'/Lse)$$

$(Rimg\_h-Rimg\_h')/2=Rimg\_h/2*(1-Ls1'/Lse)$: number of pixels to cut on each side

AND $$Rimg\_v'=Rimg\_v/Lse*Ls1'$$

$(Rimg\_v-Rimg\_v')/2=Rimg\_v/2*(1-Ls1'/Lse)$: number of pixels to cut on each side For example, an image with a horizontal resolution of 1920 pixels that should have an effective width of 50 cm (Lse) at the distance from the screen but whose actual screen width is only 30 cm. The image may be cut as follows:

$$Rimg\_h'=1920\ pixels/50\ cm*30\ cm=1152\ pixels$$

Number of pixels to cut on each side=1920 pixels/2*(1−30 cm/50 cm)=384 pixels $$Rimg\_v'=1080\ pixels/50\ cm*30\ cm=648\ pixels$$

Number of pixels to cut on each side=1080 pixels/2*(1−30cm/50 cm)=216 pixels

The final image would therefore have a resolution of 1152×648 pixels with the same aspect ratio of 1.78:1. All that remains is to adjust the resolution of the image thus obtained to the resolution of the screen to present it in full screen mode.

Method Adaptation for Parallel Screens

A single screen system is now studied.

As shown in FIGS. 15A, 15B and 15C, a user is looking at an image on a television offering a field of view more limited to the distance from where the user sits to watch the screen. As seen earlier, the final screen width is given by the formula Ls1'=Ls+Io.

To adjust the image on the screen, two of the following steps can be performed:

STEP 1: Adjust the image resolution (Rimg_h and Rimg_v) of the two images (left and right eye) so that the images respect the initial ratio Ds/Lse STEP 2: Cut the right-hand portions of the image of the left and right eye of the new eye obtained from the technique of section 5

Let us take the example of an observer with an interocular distance of 6.5 cm and looking at a television of 140 cm width (Ls), a 1920×1080 pixel resolution image which should have a width of 200 cm (Lse). Step 1 will first be carried out.

STEP 1:

Ls1' is first determined, which is equal to Ls+Io, that is 146,5 cm. Since Lse is greater than Ls1', the images of the left eye and the right eye by are reduced the following method:

*Rimg_h'=Rimg_h/Lse\*Ls1'*=1920 pixels/200 cm\*146,5 cm=1406 pixels

*(Rimg_h'−Rimg_h)/2=Rimg_h/2\*(1−Ls1'/Lse)*: number of pixels to cut on each side=1920 pixels/2\* (1−146,5 cm/200 cm)=257 pixels

AND

*Rimg_v'=Rimg_v/Lse\*Ls1'*=1080 pixels/200 cm\*146,5 cm=791 pixels

*(Rimg_v'−Rimg_v)/2=Rimg_v/2\*(1−Ls1'/Lse)*: number of pixels to cut on each side=1080 pixels/2\* (1−146,5 cm/200 cm)=144.5 pixels The intermediate image has therefore a resolution of 1406×791 pixels retaining the same initial aspect ratio of 1.78:1. Step 2 is now carried out.

STEP 2:

The right part of the left eye and the left part of the right eye are cut using the intermediate image as the basis of calculation as follows:

*Io/(Ls+Io)\*Rimg_h'*

6.5cm/(140 cm+6.5 cm)\*1406 pixels=62.3823 pixels

To maintain the aspect ratio of the original image, the image is cut along the vertical axis by the same proportion:

*Io/(Ls+Io)\*Rimg_v'*

6.5cm/(140 cm+6.5 cm)\*791 pixels=35,0956 pixels

The final image for the left eye will therefore be a section of the original image (part of the right) with a resolution of 1344×756 pixels and with an aspect ratio of 1.78:1. The image of the right eye will be composed of the equivalent left section of the original image of the right eye, i.e. a section of 1344×756 with the same vertical alignment as the section of the left eye. All that remains is to adjust the resolution of the left eye and right eye images to that of the screen to obtain the final images to be displayed in full screen mode.

Stereoscopic Zoom: Changing the Image Size (Lse')

In monoscopy, a zoom corresponds to a magnification of an image in the x and y axes by a given factor. If a zoom of 2 is made, then the image will appear twice as large as the original image. On the other hand, as seen previously, such a magnification in stereoscopy will have an effect not only on the size of the image on the screen but also on the perceived depth of objects.

With an example of a stereoscopic image presented to scale for a given screen (Z=1, Io/B=1), the pair of stereoscopic images (left and right image) are modified identically by a factor of X so that Lse'/Lse=X. The impact of this change for a given user staying at the same distance from the screen is observed.

Impact on Perceived Distance

According to the equations established above, it can be established that:

$$\frac{Dp'}{Dp} = \frac{Io/B * Ds/Lse' * Lc/F * Drn}{Io/B * Ds/Lse * Lc/F * Drn} = \frac{Lse}{Lse'} = \frac{1}{X}$$

So for an image magnification factor of X, the perceived distance of objects will be reduced proportionally by 1/x.

Impact on the Perceived Width

According to the equations established above, it can also be established that:

$$\frac{Lp'}{Lp} = \frac{Lse' * Dp'/2Ds}{Lse * Dp/2Ds} = \frac{Lse'}{Lse} * \frac{Dp'}{Dp} = X * \frac{Dp'}{Dp} = X * \frac{1}{X} = 1$$

So for an image magnification factor of X, the perceived width of the objects will be unchanged.

Impact on the Proportionality

Finally, according to the equations established above, it can be established that:

$$\frac{Z'}{Z} = \frac{Ds/Lse' * Lc/F}{Ds/Lse * Lc/F} = \frac{Lse}{Lse'} = \frac{1}{X}$$

So for an image magnification factor of X, the proportionality scale will be changed by an inversely proportional factor of 1/x.

Figure 18A:
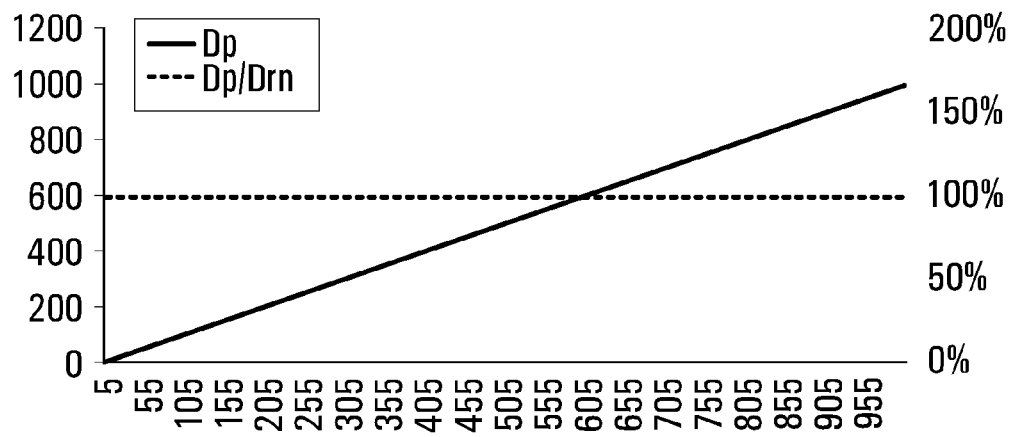
FIG. 18A is a graph of object depth when the depth of scale is 1, namely where objects are perceived at the same distance as in the real world.
Figure 18B:
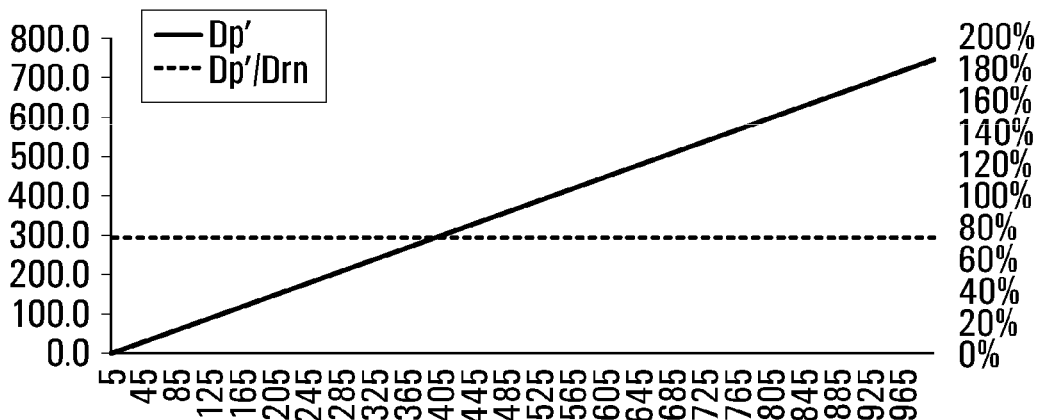
FIG. 18B is a graph of object depth when the depth of scale is less than 1, namely where objects are perceived closer than in the real world.
Figure 18C:
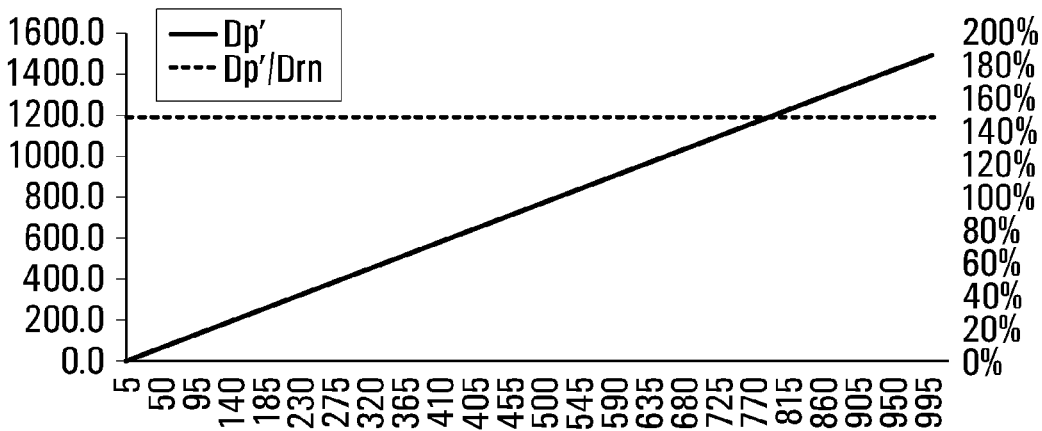
FIG. 18C is a graph of object depth when the depth of scale greater than 1, namely where objects are perceived farther than in the real world.

In summary (see the graphs of FIGS. 18A, 18B and 18C):

|  | Original | Zoom in | Zoom out |
| --- | --- | --- | --- |
| Effective width | X = 1<br>Lse' = Lse | X > 1<br>Lse' > Lse | X < 1<br>Lse' < Les |
| Scale of depth | Épr = 1<br>Objects perceived at the same distance as in the real world | Épr = 1/X < 1<br>Objects perceived closer than in the real world | Épr = 1/X > 1<br>Objects perceived farther than in the real world |
| Spatial scale | Ésp = 1<br>Objects appear of the same width as in the real world | Ésp = 1 | Ésp = 1 |
| Scale of proportionality | Z = 1<br>Proportional or orthostereoscopy | Z = 1/X < 1<br>Flattened world | Z = 1/X > 1<br>Stretched World |

In order to preserve the proportionality of the stereoscopic representation, the change in the perceived distance of the image is accompanied by an equal and proportional change in the perceived size of the image. In other words, the variation of the spatial scale (Esp=Io/B) is equal to the variation of the depth scale (Epr) so that the scale of proportionality remains equal to 1.

However, the components of the spatial scale (Io and B) cannot be modified because the base of the stereoscopic camera system has already been fixed to the shoot and the distance between the two eyes of the user can obviously not be modified. In other words, there is no way of preserving the proportionality of the experience once the scale or magnification of the image on the screen is changed.

So for a zoom with the image magnification method:

A zoom in will allow «entering» in the 3D world. The field of view will be smaller and the 3D world will flatten.

A zoom out will allow a user to retreat from the 3D world. The field of view will be wider and the 3D world will stretch.

Stereoscopic Zoom: Changing the Optical Base (Bo)

The following exemplary illustration is provided. When a zoom is made, there is globally a change in the scale (x, y, z) by a factor X such that:

$$\text{Delta } Z = X = \frac{Dp'}{Dp} = \frac{Lp'}{Lp}$$

If it is true that one can not change the interocular distance of a user (Io), one can however change the positioning of the images with respect to the center of the optical axis of the two eyes. Optical base (Bo) is defined as the distance between the center of the two images on the screen. It can be shown how the basic optical change impacts the perceived width and perceived depth of objects.

Impact on Perceived Width

Figure 19B:
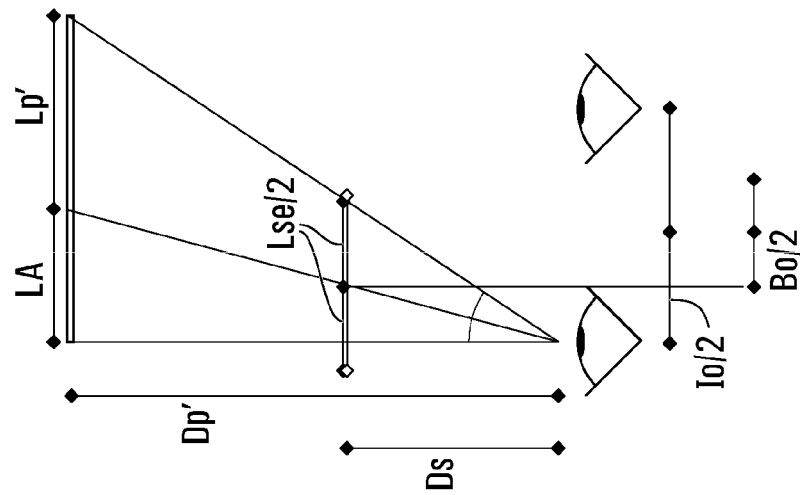
FIG. 19B illustrates the resulting change in object width as a result of modifying Bo.
Figure 19A:
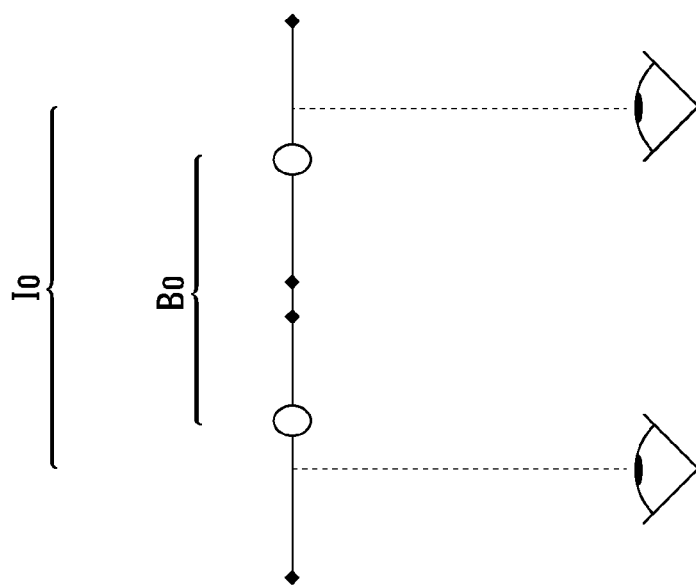
FIG. 19A illustrates the geometry of Io and Bo for the images displayed on the screen.

FIG. 19A illustrates the geometry of Io and Bo for the images displayed on the screen, and FIG. 19B illustrates the resulting change in object width as a result of modifying Bo.

The optical base is positioned so that its middle is perfectly centered between both eyes of the observer.

It can be established that:

$$\frac{La + Lp'}{Dp'} = \frac{Lse/2 + (Io/2 - Bo/2)}{Ds} = \frac{Lse + (Io - Bo)}{2Ds}$$

AND $$\frac{La}{Dp'} = \frac{(Io/2 - Bo/2)}{Ds} \text{ OR } La = \frac{Dp'(Io - Bo)}{2Ds}$$

By replacing [La] in the first equation with the result of the second, it can be established that:

$$\frac{La + Lp'}{Dp'} = \frac{Dp'(Io - Bo)/2Ds + Lp'}{Dp'}$$

$$\frac{Dp'(Io - Bo)/2Ds + Lp'}{Dp'} = \frac{Lse + (Io - Bo)}{2Ds}$$

$$\frac{(Io - Bo)}{2Ds} + \frac{Lp'}{Dp'} = \frac{Lse + (Io - Bo)}{2Ds}$$

$$\frac{Lp'}{Dp'} = \frac{Lse}{2Ds} + \frac{(Io - Bo)}{2Ds} - \frac{Lse}{2Ds}$$

SO $$Lp' = \frac{Lse * Dp'}{2Ds}$$

The proportion ratio Lp' on Lp can now be established:

$$\frac{Lp'}{Lp} = \frac{Lse' * Dp'/2Ds}{Lse * Dp/2Ds} = \frac{Dp'}{Dp}$$

So for a given image width, the perceived change in the width of an object will be equal to the perceived change in the distance of that object. The change of the optical base allows the condition of proportionality of the scale to be met. How a change in the optical base affects the perceived distance of objects in the stereoscopic representation will now be described.

Impact on the Perceived Distance

Figure 20B:
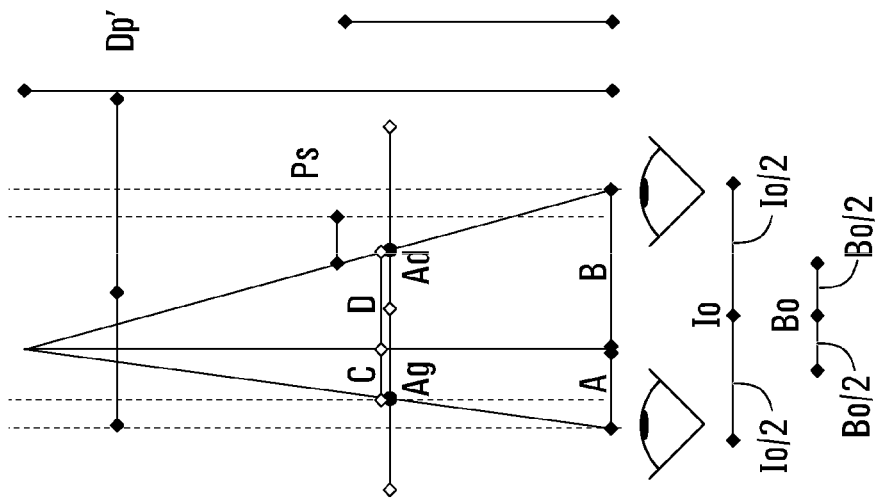
FIG. 20A illustrates the geometry of a distant object when Bo is equal to Io and FIG. 20B illustrates the impact when using an optical base Bo lower than Io on the appearance of the distant object.
Figure 20A:
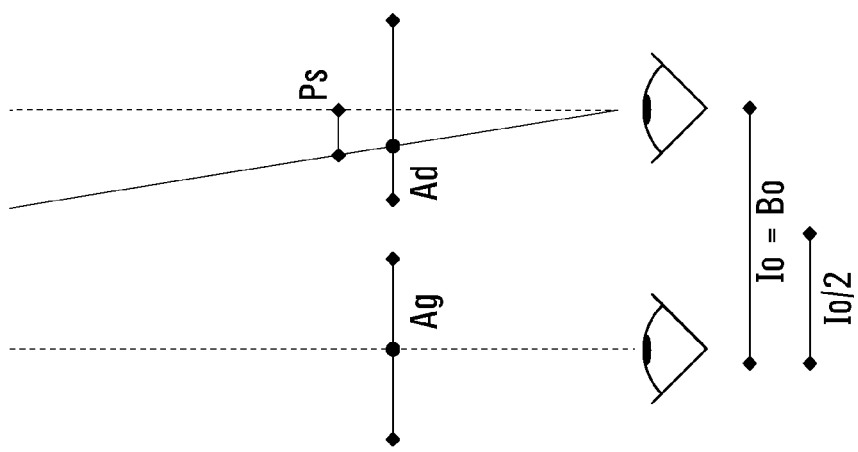

An object located respectively at the points Ag and Ad of the image of the left and right eye is taken. FIGS. 20A and 20B show the impact when using an optical base Bo lower than Io.

Based on the properties of the rectangle triangles, it can be established that:

$$\frac{A + B}{Dp'} = \frac{C + D}{Dp - Ds} \text{ YET } \begin{aligned} A + B &= Io \\ C + D &= Bp - Ps \end{aligned}$$

SO $$\frac{Io}{Dp'} = \frac{Bo - Ps}{Dp' - Ds} \text{ OR } \frac{Dp'}{Io} = \frac{Dp' - Ds}{Bo - Ps}$$

$$Dp' * (Bo - Ps) = Io * Dp' - Io * Ds$$

$$Dp'(Bo - Ps) - Dp' * Io = -Ds * Io$$

$$Dp'(Bo - Ps - Io) = -Ds * Io$$

$$Dp' = \frac{-Ds * Io}{Bo - Ps - Io} = \frac{Ds * Io}{Ps + Io - Bo}$$

The proportion ratio Dp'/Dp can be established as follows:

$$Dp' = \frac{Ds * Io}{Ps + Io - Bo} \text{ AND } Dp = \frac{Ds * Io}{Ps}$$

$$\frac{Dp'}{Dp} = Dp' * \frac{1}{Dp} = \frac{Ds * Io}{Ps + Io - Bo} * \frac{Ps}{Ds * Io}$$

$$\frac{Dp'}{Dp} = \frac{Ps}{Ps + Io - Bo}$$

This relationship demonstrates that when using a different optical base, the orthostereoscopic effect is lost. Indeed, while variations of Dp are linear, the variations of the ratio Dp'/Dp are not linear, since they vary according to Ps, namely, they vary as a function of the distance of the objects which were captured in the real world. For a unit variation of Drn, the variation of Dp' will change according to the value of Drn. This can be seen as a number of zones in which there is approximately linearly proportional variation. With this relationship, the value of X (3D magnification ratio) can now be calculated:

$$\frac{Dp'}{Dp} = \frac{Ps}{Ps + Io - Bo} = X$$

$$\frac{1}{X} = \frac{Ps + Io - Bo}{Ps}$$

$$\frac{1}{X} = 1 + \frac{(Io - Bo)}{Ps}$$

$$\frac{1}{X} = 1 + \frac{Io - Bo}{(B.F.Lse/Drn * Lc)}$$

YET $Lse = Ds * Lc / F$ $$\frac{1}{X} = 1 + \frac{Io - Bo}{(B * F * Ds * Lc * F)/(Drn * Lc)}$$

$$\frac{1}{X} = 1 + \frac{Io - Bo}{(B * Ds / Drn)}$$

$$X = \frac{1}{1 + \frac{(Io - Bo)}{(B * Ds / Drn)}}$$

This result demonstrates that the magnification factor X is only valid for a specific real distance Drn. For example, if a 3D magnification equivalent to one third of the original representation is obtained, an original distance (Drn) in order to achieve this relationship may be specified. Arbitrarily, the distance Drn is chosen as a real reference distance which, in orthostereoscopic mode, is displayed in the zero plane that is to say at the distance from the screen (Dp=Ds). The result is:

$$Dp = Ds = \frac{Io * Ds * Lc * Drn}{B \quad Lse \quad F}$$

In *ortho*, $$Ds / Lse = F / Lc$$

$$Ds = \frac{Io * F * Lc * Drn}{B \quad Lc \quad F}$$

$$Ds = \frac{Io * Drn}{B}$$

$$Drn = Ds * \frac{B}{Io}$$

SO $$B * \frac{Ds}{Drn} = B * \frac{Ds}{Ds * B / Io} = Io$$

AND $$X = \frac{1}{1 + (Io - Bo)/Io}$$

$$X = \frac{1}{1 + 1 - Bo/Io}$$

$$X = \frac{1}{2 - Bo/Io}$$

Conversely, when Bo is to be determined, giving a desired 3D magnification, Bo may be isolated as follows:

$$X = \frac{1}{2 - Bo/Io}$$
$$\frac{1}{X} = 2 - \frac{Bo}{Io}$$
$$\frac{Bo}{Io} = 2 - \frac{1}{X}$$
$$Bo = Io * \left(2 - \frac{1}{X}\right)$$

Figure 21A:
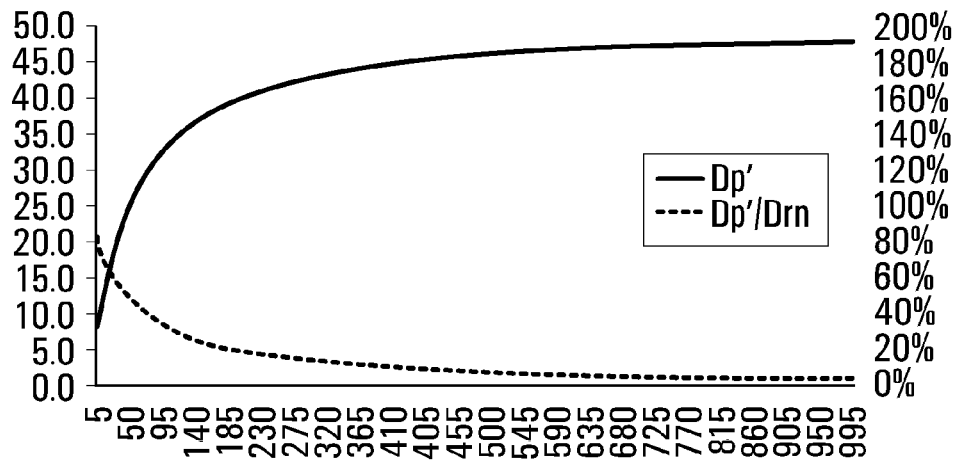
FIG. 21A is a graph showing perceived space not being linear.
Figure 21B:
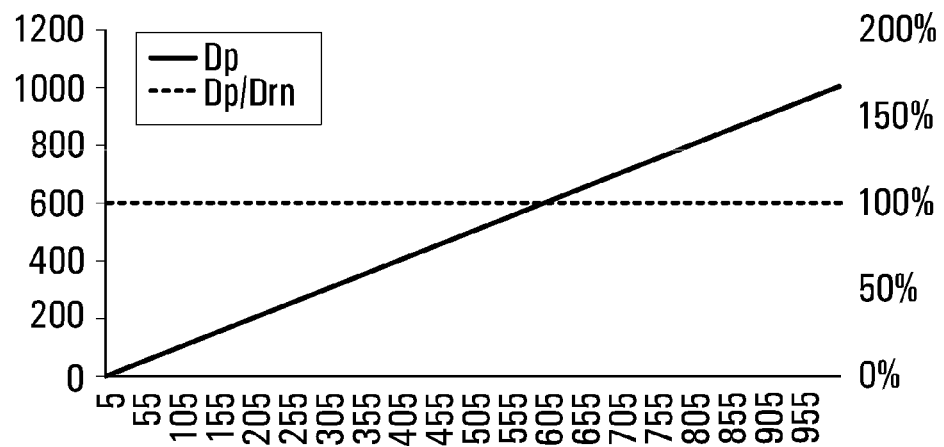
FIG. 21B is a graph illustrating the ratio between distances in the real world versus the perceived world.

The graphs of FIGS. 21A and 21B illustrate the impact of a modification of the optical base on the ratio between the distances of the real world and the perceived world.

As shown in the graphs above, the perceived space is not linear (ratio Dp'/Drn not constant) in addition to not being orthostereoscopic. When zooming inside the image by changing the optical base, a plateau is rapidly reached in the perceived distances. The maximum distance perceived (when Drn=infinity) is calculated as follows:

$$Ps = \frac{B * F * Lse}{Drn * Lc}$$
WHEN Drn = infinity, Ps = 0 So
$$Dp' \text{ MAX} = \frac{Ds * Io}{Ps + Io - Bo} = \frac{Ds * Io}{Io - Bo}$$

Method Limitations

First of all, it is not possible to zoom out because there would be divergence in objects at distances from Drn to infinity. An object at infinity would normally be represented in the center of each eye when Bo=Io. If Bo is greater than Io, then the points will be found to the left of the left eye and to the right of the right eye, respectively. Since the eyes cannot diverge, this method would make fusion impossible and cause pain for the user.

Also, this method does not significantly increase the portion of the perceived image. Since the images are only moved a few centimeters, the expected effect cannot be achieved by zooming (i.e. significantly change the field of view).

Finally, the optical base modification leads to significant spatial distortions and causes the loss of space linearity and orthostereoscopic effect. For all these reasons, changing the optical base is not the recommended method for 3D zooming of a stereoscopic image.

Comfortable stereoscopic representation taking into account the management of vergence and accommodation To establish the depth of an object, the brain uses many visual cues that it combines together to obtain a greater level of certainty. For example, interposition, motion parallax, blur, perspective lines and, of course, stereopsis (parallax) can be used. In conventional/monoscopic video games and cinema, many of these techniques are used to give a greater sense of depth to the content and sometimes to provide an impression of depth to the spectators/players.

In the case of stereoscopic content, an impression of depth is given by using a parallax difference. However, parallax information often conflicts with other visual cues. For example, one case is that of an object that should be in front of a screen but whose image is "cut off" by the edge of the screen as illustrated in FIG. 22.

Figure 22:
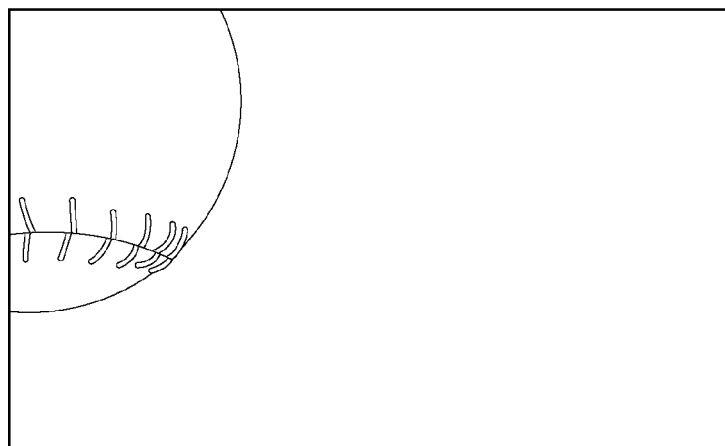
FIG. 22 is an illustration of a close object partially out of the field of view that causes difficulty in perceiving the depth of the close object because of the conflict with the associated screen edge or frame.

In the image of FIG. 22, the baseball should come out of the screen according to the stereoscopic information, however, it "touches" the frame, that is to say that the frame of the screen seems to block the image of the ball. But in everyday life, the brain has learned that an object that visually blocks another object is in front of it (phenomenon of interposition). So there is a conflict between visual cues, and since interposition is commonly used by the visual cortex, the brain decides to reject stereoscopic information and position the ball at the screen (e.g. will refuse to perceive it in front of the screen). Stereographers are familiar with this phenomenon and are careful to correctly frame the objects that are to appear in front of the screen.

Figure 23B:
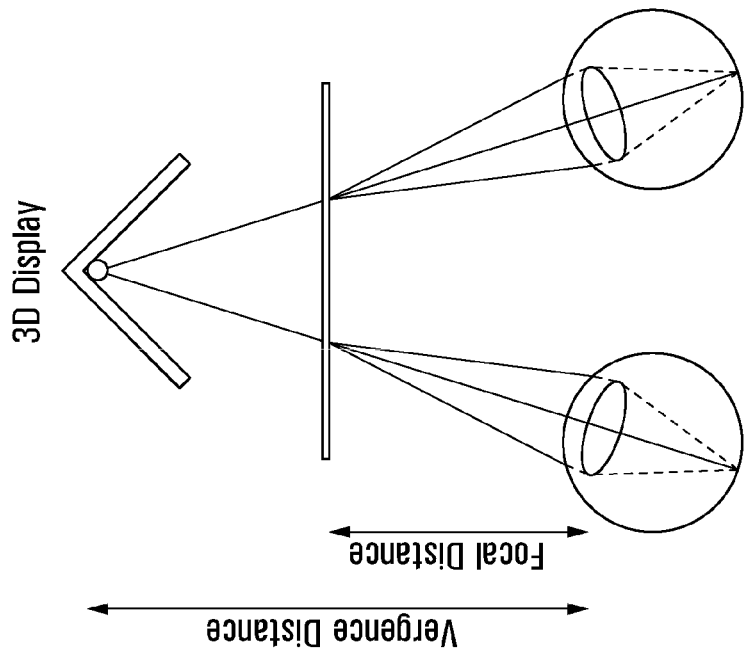
FIG. 23B illustrates schematically the vergence distance and the closer focal distance of the screen in stereoscopic 3D viewing.
Figure 23A:
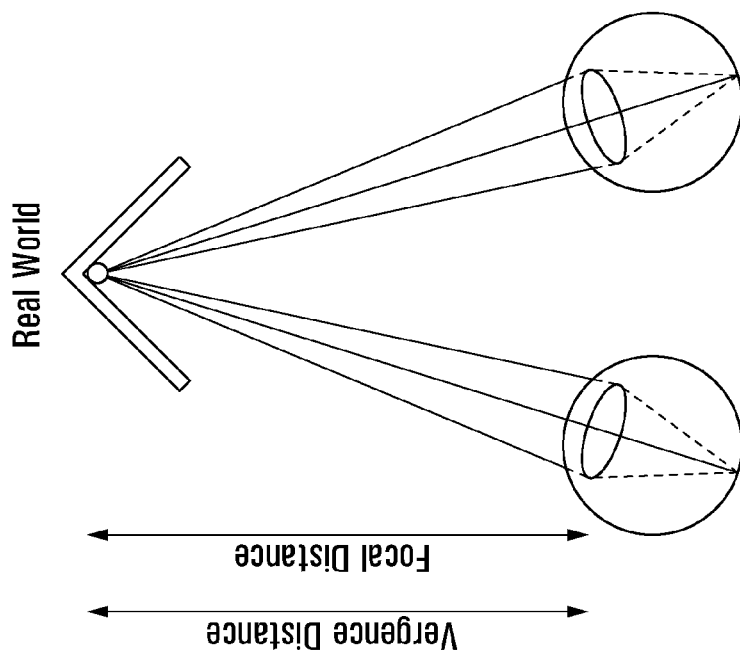
FIG. 23A illustrates schematically the vergence distance and the focal distance that are the same for real world viewing.

The other principal issue comes from the difference between vergence information (where the eyes converge) and accommodation (distance to which the eyes focus). The brain regularly manages these two pieces of information concurrently to allow for clear vision. These two pieces of information are supposed to be in agreement with each other and the brain uses both pieces of information together to make better decisions (adjustments). In stereoscopy, these two pieces of information are not always in agreement because although convergence is achieved at a given distance (Dp), the eyes will focus at the distance of the screen (Ds). FIG. 23A illustrates schematically the vergence distance and the focal distance that are the same for real world viewing, and FIG. 23B illustrates schematically the vergence distance and the closer focal distance of the screen in stereoscopic 3D viewing.

It has been shown in the literature that when there is too much conflict between vergence and accommodation in stereoscopy, many adverse effects may occur such as discomfort, pain (sometimes persistent) and diplopia (double-vision, no fusion). This conflict between vergence and accommodation has not only an impact on the level of comfort but also on the perception of depth of objects in a stereoscopic representation.

Experimentation has been conducted with parallel cameras as well as with computer-generated objects placed at various distances. At the time of the observation, it has been observed that despite the important differences of parallax (measured and validated on the screen), the perception of the distance of the object changed only modestly for the positioning of objects very far from the screen. When there is a conflict between the vergence and accommodation information, the human brain may give precedence to the accommodation information and the perceived distance of objects will be related to the distance from the screen. This effect may be accentuated if there are many objects in the field of view near the screen corroborating the accommodation information.

In order to manage this problem, the maximum or farthest distance (perceived «inside» the screen) and minimum distance («out» of the screen) respecting the angular constraint are determined.

Maximum Distance (Df)

According to the article "Visual Discomfort and Visual Fatigue of Stereoscopic Displays: A Review" by Marc Lambooij et al., published in the *Journal of Imaging Science and Technology*, dated May-June 2009 (53(3): 030201-030201-14, 2009), it is proposed to respect a limit of 1° between the angle formed by the eyes when they converge on the screen ("accommodation" angle) and the maximum or minimum convergence angle to maintain a comfortable experience. This principle is used as a basis for determining the maximum and minimum distance of stereoscopic perception. It is important to note that there is an important difference between visualization with lenses (e.g., stereoscopes, virtual reality headsets), where the accommodation is done at infinity, and conventional screens where the accommodation is done at the distance of the screen. The case of conventional screens will first be described.

FIG. 24A represents a case of convergence on the inside of the screen. From this figure, finding the value of the distance of an object (Do) is established as follows:

$$\frac{Do}{Io} = \frac{Do - Ds}{P}$$

$$\frac{P * Do}{Io} = Do - Ds$$

$$\frac{P * Do}{Io} - Do = -Ds$$

$$Do\left(\frac{P}{Io} - 1\right) = -Ds$$

$$Do = \frac{Ds}{(1 - P/Io)}$$

With respect to FIG. 24B, when the eyes converge on the screen, the convergence angle of the left eye is equal to θ. When the eyes converge «inside» the screen, the angle formed is reduced to θ' for each eye. The value of P that will meet the angular constraint of vergence (V, expressed in radians, is the angle multiplied by π and divided by 180°) while maintaining stereoscopic perception and comfort of viewing is now determined:

$$\tan\theta = \frac{Io/2}{Ds} = \frac{Io}{2Ds}$$

$$\theta' = \theta - V/2 \text{ (both eyes converge)}$$

$$\tan\theta' = \tan\left(\theta - \frac{V}{2}\right) = \frac{Io/2 - P/2}{Ds} = \frac{Io - P}{2Ds}$$

$$\theta = \operatorname{atan}(Io/2Ds)$$

$$\tan(\theta - V/2) = \tan(\operatorname{atan}(Io/2Ds) - V/2)$$

$$\tan(\operatorname{atan}(Io/2Ds) - V/2) = \frac{Io - P}{2Ds}$$

$$2Ds * \tan(\operatorname{atan}(Io/2Ds) - V/2) = Io - P$$

$$P = Io - 2Ds * \tan(\operatorname{atan}(Io/2Ds) - V/2)$$

Now that the value of P is obtained, fulfilling the condition of vergence, P can be integrated into the previous equation and the maximum distance is obtained as follows:

$$Df = \frac{Ds}{(1 - P/Io)}$$

$$Df = \frac{Ds}{1 - \left(\frac{Io - 2Ds * \tan(\operatorname{atan}(Io/2Ds) - V/2)}{Io}\right)}$$

$$Df = \frac{Ds * Io}{2Ds * \tan(\operatorname{atan}(Io/2Ds) - V/2)}$$

$$Df = \frac{Io}{2 * \tan(\operatorname{atan}(Io/2Ds) - V/2)}$$

Starting from a distance to the screen, all objects to infinity can be comfortably merged as they will all be within the vergence constraint. To establish this distance, the value of Ds is established when Df tends to infinity as follows:

$$Df = \frac{Io}{2*\tan(\mathrm{atan}(Io/2Ds) - V/2)}$$
$$\tan(\mathrm{atan}(Io/2Ds) - V/2) = Io/2*Df$$
When $Df$ tends to infinity, $Io/Df = 0$ So:
$$\tan(\mathrm{atan}(Io/2Ds) - V/2) = 0$$
$$\mathrm{atan}(Io/2Ds) - V/2) = 0$$
$$Io/2Ds - V/2 = 0$$
$$Io/2Ds = V/2$$
$$Ds = Io/V$$

Taking an example of a person with an interocular distance of 6.5 cm and where a limit of vergence of 2° or 2° π/180° in radians is respected, then the distance to the screen that will allow a comfortable fusion to infinity would be:

$$Ds = Io/V$$

$$Ds = 6.5 \text{ cm}/(2°\pi/180°)$$

$$Ds = 186.21 \text{ cm}$$

This demonstrates that for stereoscopic representations on screens at a relatively close distance from an average user, the stereoscopic effect can have a natural and very important depth (up to infinity). This corresponds well to the projections in room as well as to the viewing on televisions 3D. On the other hand, for viewing on stereoscopic screens closer to the user (eg, mobile phones, computer screens, tablets, etc.), there are serious depth limitations. For example, for the same user as in the previous example, a screen is placed at 60 cm from the user (e.g. a laptop), the maximum acceptable depth under the constraint of 2° would be 88.6 cm or only 28.6 cm inside the screen which is very limiting.

Minimum Distance (Dn)

With reference to FIGS. 25A and 25B, the minimum distance perceived by a user of an object coming out of the screen is now calculated, that is to say positioned between the user and the screen.

FIG. 25A represents a case of convergence in front of the screen. From this figure, finding the value of the distance of an object (Do) can be established as follows:

$$\frac{Do}{Io} = \frac{Ds - Do}{P}$$
$$\frac{P*Do}{Io} = Ds - Do$$
$$\frac{P*Do}{Io} + Do = Ds$$
$$Do\left(\frac{P}{Io} + 1\right) = Ds$$
$$Do = \frac{Ds}{(P/Io + 1)}$$

With reference to FIG. 25B, when the eyes converge on the screen, the convergence angle of the left eye is equal to θ. When the eyes converge in front of the screen, the angle formed is increased to θ' for each eye. The value of P that will respect the vergence angular constraint (V, expressed in radians, is the angle multiplied by π and divided by 180°) while maintaining a stereoscopic perception and comfort of viewing is then determined:

$$\tan\theta = \frac{Io/2}{Ds} = \frac{Io}{2Ds}$$
$$\theta' = \theta - V/2 \text{ (both eyes converge, angles in radians)}$$
$$\tan\theta' = \tan\left(\theta + \frac{V}{2}\right) = \frac{Io/2 + P/2}{Ds} = \frac{Io + P}{2Ds}$$
$$\theta = \mathrm{atan}(Io/2Ds)$$
$$\tan(\theta - V/2) = \tan(\mathrm{atan}(Io/2Ds) + V/2)$$
$$\tan(\mathrm{atan}(Io/2Ds) + V/2) = \frac{Io + P}{2Ds}$$
$$2Ds*\tan(\mathrm{atan}(Io/2Ds) + V/2) = Io + P$$
$$P = 2Ds*\tan(\mathrm{atan}(Io/2Ds) + V/2) - Io$$

Now that the value of P corresponding to the constraint of vergence is determined, the P value can be integrated into the preceding equation and the minimum distance (Dn) is obtained as follows:

$$Dn = \frac{Ds}{(P/Io + 1)}$$

$$Dn = \frac{Ds}{\left(\frac{2Ds * \tan(\operatorname{atan}(Io/2Ds) + V/2) - Io)}{Io}\right) + 1}$$

$$Dn = \frac{Ds * Io}{2Ds * \tan(\operatorname{atan}(Io/2Ds) + V/2)}$$

$$Dn = \frac{Io}{2 * \tan(\operatorname{atan}(Io/2Ds) + V/2)}$$

Parameterization to Respect the Vergence-accommodation Conflict

The maximum and minimum distances of a stereoscopic representation respecting the vergence-accommodation conflict have been determined to be:

Far Distance:
$$Df = \frac{Io}{2 * \tan(\operatorname{atan}(Io/2Ds) - V/2)}$$

Close Distance:
$$Dn = \frac{Io}{2 * \tan(\operatorname{atan}(Io/2Ds) + V/2)}$$

It has been shown that a modification of the field of view (Lse') cannot reduce the total depth of the perceived world in the stereoscopic representation. Indeed, a point at infinity captured with parallel cameras will be perceived to infinity in the stereoscopic representation regardless of how the stereoscopic field of view is changed (always centered on each eye). On the other hand, it has been demonstrated that the depth of the perceived world can be reduced in the representation by altering the optical base of the system.

The optical base in order to respect the Df constraint is now determined. The most distant point captured by the parallel camera system (Drn=infinity) is perceived in stereoscopic representation at the maximum distance allowing a comfortable experience (Dp'=Df):

When $Drn$ = infinity, $Ps$ = 0 So $$Df = Dp' = \frac{Ds * Io}{Ps + Io - Bo} = \frac{Ds * Io}{Io - Bo}$$

$$Io - Bo = \frac{Ds * Io}{Df}$$

$$Bo = Io - \frac{Ds * Io}{Df}$$

$$Bo = Io - Ds * \frac{Io}{\frac{Io}{2 * \tan(\operatorname{atan}(Io/2Ds) - V/2)}}$$

$$Bo = Io - Ds * 2 * \tan(\operatorname{atan}(Io/2Ds) - V/2)$$

Note that this adjustment is made for any distance to the screen less than the minimum distance allowing a fusion at infinity so that Ds<Io/V (V expressed in radians). For any screen distance greater than Io/V, the optical base can be set to Io.

When the optical base is established at a value less than Io, the linearity of space is also changed. One consequence of this change in space is that objects in orthostereoscopy would normally end up at the distance of the screen are now «out» of the screen. Thus, a portion of the image that should be inside the screen now comes out of the screen which causes discomfort and creates framing problems.

In order to solve this problem, a modification of the image size (Lse) can be used so that the real distance of the objects presented in the zero plane (distance from the screen) is the equivalent to the scale orthostereoscopic representations. For example, in the case of an image captured at a scale of 1 (proportional to the natural world) whose stereoscopic representation would be on a screen located at 60 cm from a user, it is preferable that an object perceived at a distance of 60 cm from the screen be located at 60 cm from the camera when the image with the object was captured.

To do this, the real distance of an object presented on the screen is established in the case of an orthostereoscopic representation with Bo=Io. This distance can be calculated as follows: Drn=Ds*B/Io. The image width Lse' that will allow the perceived distance (Dp') to be equal to the distance to the screen (Ds) and Drn is established. It can be determined as follows:

$$Dp' = Ds = \frac{Ds * Io}{Ps + Io - Bo}$$
$$1 = \frac{Io}{Ps + Io - Bo}$$
$$Ps + Io - Bo = Io$$
$$Ps = Io - Io + Bo$$
$$Ps = Bo$$
$$Ps = \frac{B * F * Lse'}{Drn * Lc}$$
$$Bo = \frac{B * F * Lse'}{Drn * Lc}$$
YET: $Drn = Ds * B / Io$
So
$$Bo = \frac{B * F * Lse'}{Ds * B / Io * Lc}$$
$$\frac{Ds * B}{Io} = \frac{B * F * Lse'}{Lc * Bo}$$
$$Lse' = \frac{Ds * Bo * Lc}{Io * F}$$

Note that when Bo is equal to Io (when the user is at a sufficiently large distance from the screen), Lse' becomes equal to Lse, resulting in a return to orthostereoscopic mode.

Figure 16A:
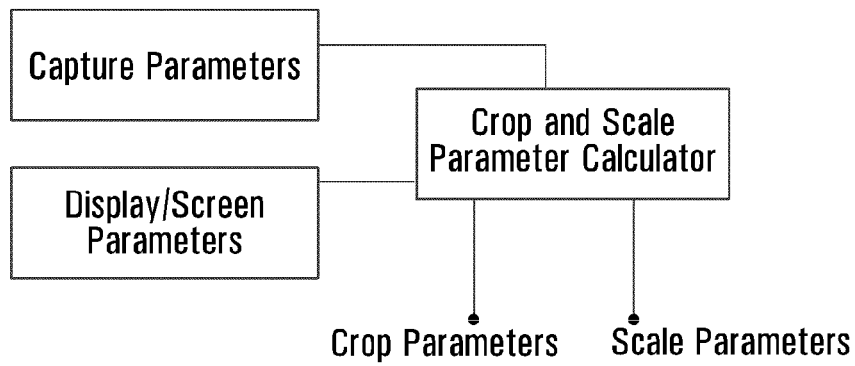
FIGS. 16A and 16B are block diagrams of an exemplary stereoscopic system for cropping and scaling an image to be viewed on a display.
Figure 16B:
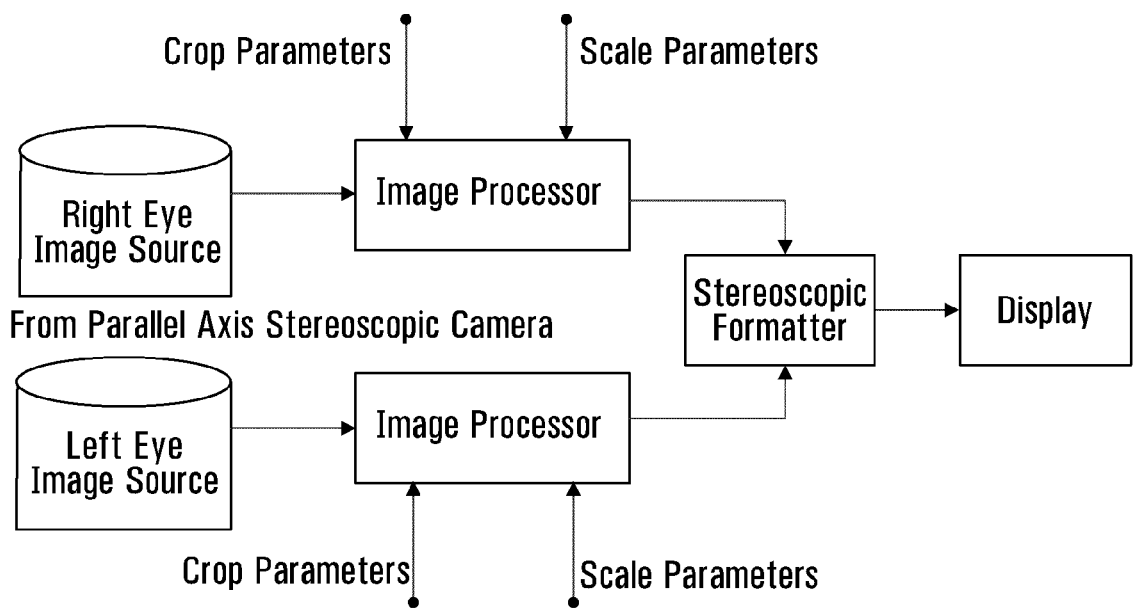

FIGS. 16A and 16B are schematic block diagrams of a device for processing parallel camera stereoscopic video to adapt to different viewing conditions. The capture parameters allow the determining of the original field of view. These parameters can be encoded in the images or video stream, set by a user or detected by video analysis. Block 12 thus represents a memory store of the capture field of view parameters and optionally includes an interface to receive field of view parameters from the image data store or the video streams 22a and 22b.

The display/screen parameters can be the screen distance, screen resolution, screen size and interocular distance of the viewer. These parameters can be stored in a memory 14. While the interocular distance can be a variable set in memory 14, it can also be fixed at a nominal value within calculator 20 that determines crop and scale parameters as described in detail above. When a screen is shared by multiple viewers, the interocular distance can be chosen to be that of the person having the smallest interocular distance to avoid divergence problems for that person.

Calculator 20 can also take into consideration the vergence constraint as described above with reference to FIGS. 17 to 25 to determine crop and scale parameters that will modify the base offset to bring distant objects closer to the screen and to scale the images with a view to reduce the vergence angle difference between the screen and the objects seen.

The distance between the viewer and the screen can be input using a user interface or other suitable way.

In the case that there is a change in the interocular distance, the scale parameters include an image shift parameter, even if other view conditions respect the original recording. However, if a 3D scene is viewed on a display smaller/larger than an original field of view, the scale parameters include an image shift to maintain the base distance between the center of each image on the different size display.

The 3D images, namely the right eye and left eye images stored in stores 22a and 22b, are accordingly shifted, scaled and cropped/border padded as required in an image processor 25 as for example is schematically illustrated in FIG. 16B. The image processor can be a GPU, CPU, FPGA or any other suitable processing device. The source of the images 22a and 22b can be a stereographic image stream as is known in the art.

As described above, the stereoscopic viewing can be done using known techniques. In the block diagram of FIG. 16B, stereoscopic formatting is done in block 28. Such image processing can be done in a CPU, however, it can also be performed for example using a GPU or an FPGA. In anaglyphic presentation, color filter glasses are worn by the viewer and the screen image is composed of both right and left image data that is color encoded. In page-flip operation, the viewer can wear shutter glasses that allow the right and left eyes to see in alternating time slots while the screen image alternates between right and left images. In an autostereoscopic display, the viewer does not need any glasses, but the screen includes a lens or screen mask that allows the right eye to see right eye pixels and the left eye to see left eye pixels. In a polarized line-interleave display, odd and even lines have different polarization of light (the pattern of pixels of each polarization need not be limited to alternating horizontal lines), and polarization glasses are worn so that one eye sees odd lines while the other sees even lines. The stereoscopic formatting for the desired display technique is done, as shown schematically in FIG. 16B, by a formatter module 28 prior to transmitting a display signal to the display device. The stereoscopic formatter operations or functions can be done within the image processors, if desired. The formatted image or images are then displayed using a corresponding display device 30.

Figure 16C:
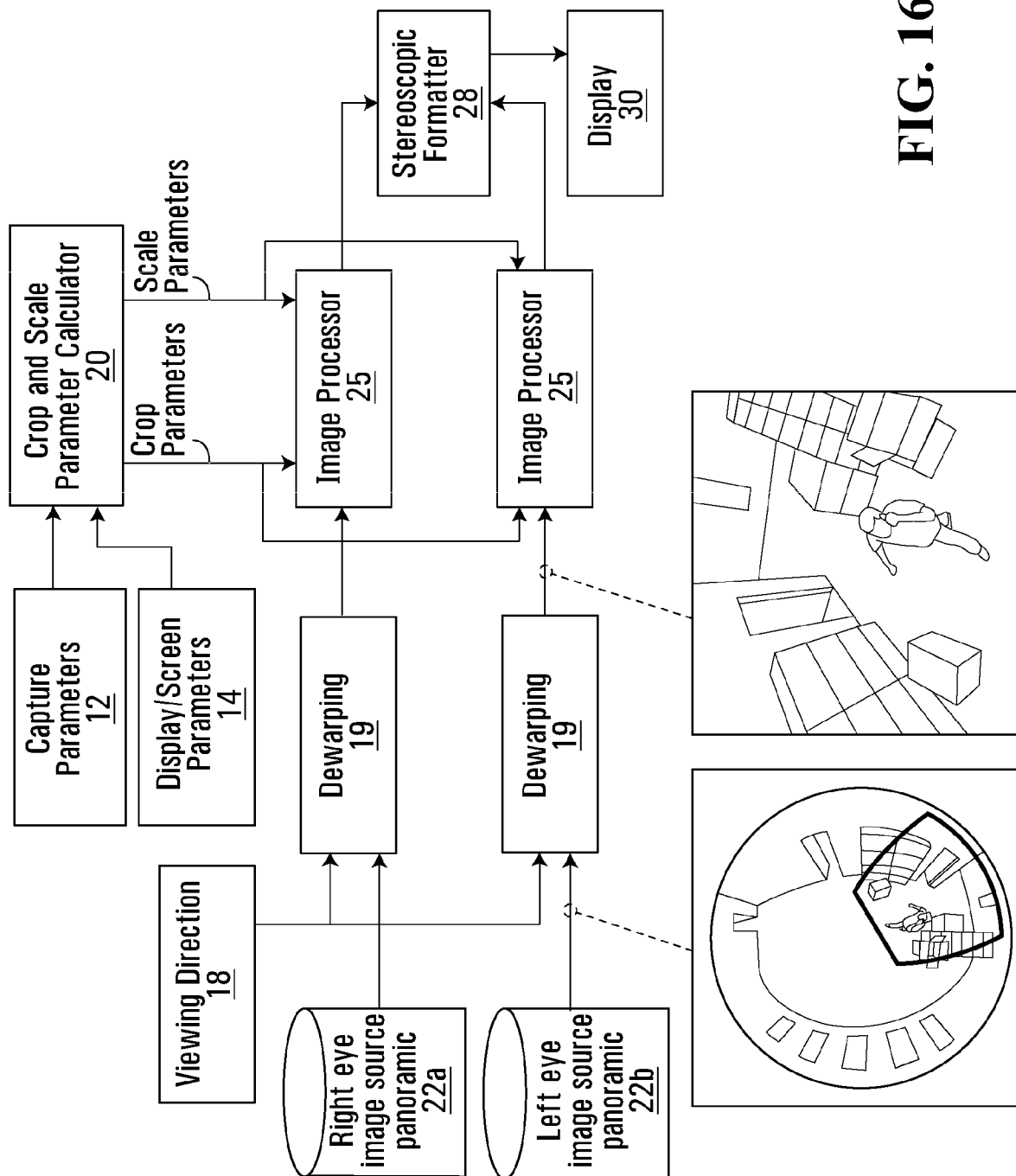
FIG. 16C illustrates the image source is a large field of view source, that is able to provide a desired image for a given viewing direction by cropping or de-warping and cropping.

In the embodiment of FIG. 16C, the image source is a large field of view source, such as a wide angle (e.g. 180- to 360-degree panoramic source), a fish eye lens or a computer-generated image source, that is able to provide a desired image for a given viewing direction by cropping or de-warping and cropping. The viewing direction module 18 can be part of a user interface to allow a user to select the viewing direction. The cropping or de-warping and cropping process is known in the art and is done in module 19. As illustrated, a source fish-eye camera image is not presentable as a 2D image until it is de-warped. The de-warping module 19 can alternatively be integrated into the image processor 25 so that the cropping and scaling required involves selecting the portion of the source image to be de-warped.

It will be appreciated that the image processing, namely cropping and scaling, can be performed using a volume reader. By volume reader, it is meant to place the original images in 3D space so as to respect the original capture parameters and to capture virtual "camera" views of the original images with the correct positioning of the points of view or cameras. This can be done within most conventional GPU's for example.

Details are as follows.

Nomenclature

D=distance

L=width

H=height

F=focal

RES=resolution

| Camera (capture) | Original representation (e.g. stereoscopic) | VR Reader | Screen |
|---|---|---|---|
| Dc | Di | Do | Ds |
| Lchamps | Li | Lo | Ls |
| Hchamps | Hi | Ho | RESs |
| Fc | | Lv | |
| Lccd | | Hv | |
| Hccd | | Fcv | |
| | | Lcv | |
| c = camera | i = image | o = object | s = screen |
| | | v = viewport | |
| | | cv = virtual camera | |

Figure 17A:
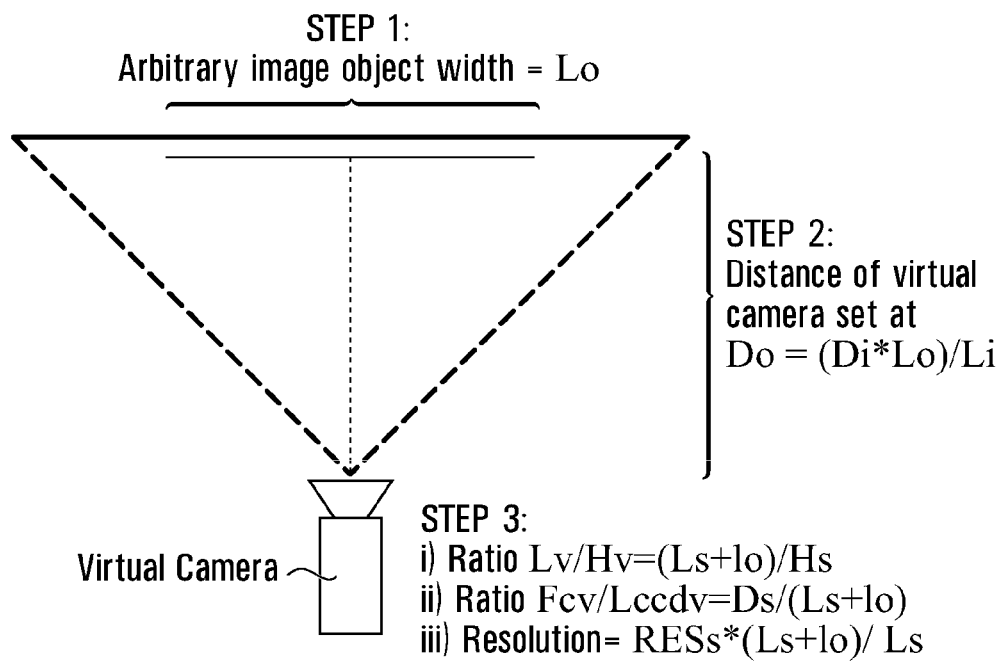
FIG. 17A is a diagram of image acquisition or rendering using a virtual camera in an exemplary volume reader method.

1) PLACE THE IMAGE IN THE SPACE (see FIG. 17A)

Position the left image with an arbitrary width Lo

Position the right image with the same width Lo

2) PLACING THE CAMERA

Center the camera on the image, where the x, y, z coordinates are set to 0.0.0 (on the origin)

Place at a distance from the image in order to respect the ratio:

$$Do/Lo=Di/Li=Fc/Lccd=Dc/Lchamps$$

or $$Do=(Di*Lo)/Li=(Fc*Lo)/Lccd=(Dc*Lo)/Lchamps$$

3) RENDER IMAGES

Create images of the left eye and right eye using:

i) Ratio Lv/Hv=(Ls+Io)/Hs ii) Ratio Fcv/Lccdv=Ds/(Ls+Io)

iii) Resolution=RESs*(Ls+Io)/Ls

Figure 17B:
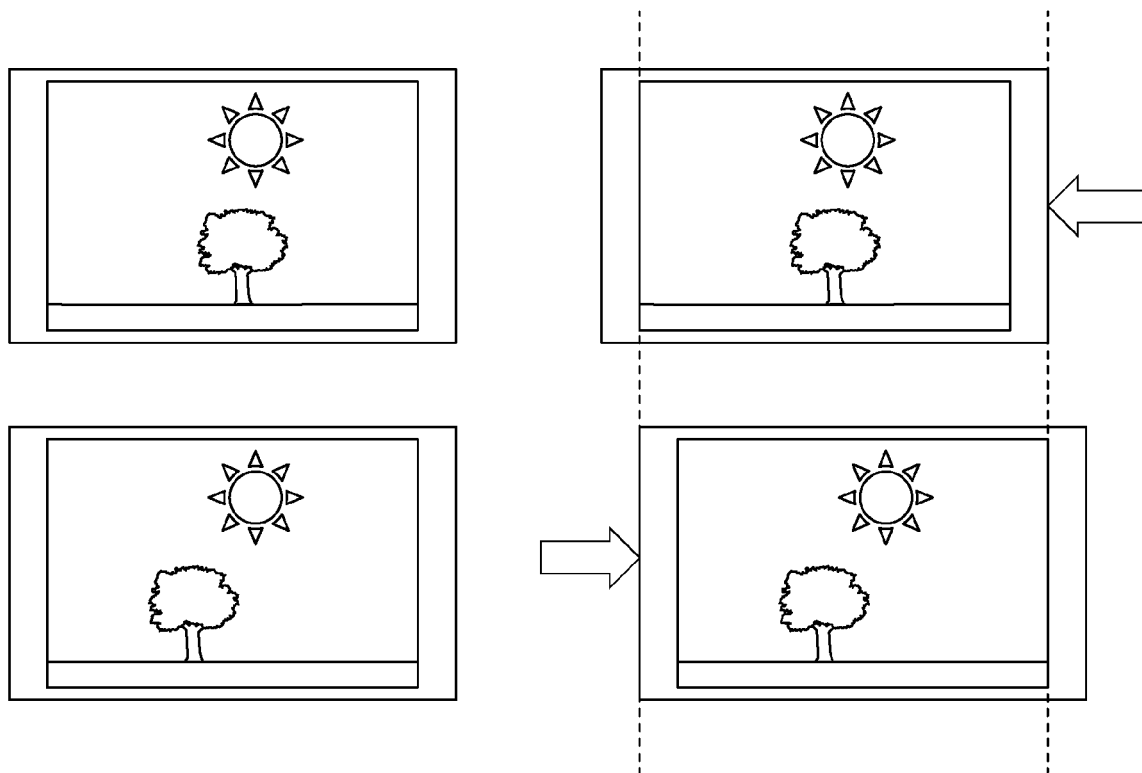
FIG. 17B is a diagram of single screen formatting in an exemplary volume reader method.

4) FORMATTING FOR SINGLE SCREEN (see FIG. 17B)

Overlay the two images

Shift the left image to the left by a distance equal to (Io/2)/(Ls+Io)*Lv

Shift the right image to the right by the same distance

Keep the common part of the two images

Format in anaglyph

Alternatively, in step 4, the image of the left eye (from the left) can be cut by a number of pixels equal to RESs—the resolution and the right eye image can be cut by the same number of pixels but from the right.

You can zoom in and out by moving the camera closer or farther away in step 2.

In the context of a streaming or online service, the images can be processed at a server and transmitted to a remote client display. In this context, the user at the display or the display equipment can relay the display/screen parameters to the server where the images are processed and then encoded for transmission to the client display. A reduction in the data to be transmitted can be achieved when the crop and scale is performed prior to transmission.

What is claimed is:

1. A method of processing stereoscopic images for display to a viewer on a single screen, said stereoscopic images having a first field of view, the method comprising using a definition of a second field of view provided by said single screen, an interocular distance lo for said viewer and a distance between said viewer and said single screen to position and to scale said stereoscopic images so that display of said images on said single screen at said distance from said viewer respects said first field of view, and when said stereoscopic images as scaled for said screen are larger than said screen, to crop said images for said screen, and when said stereoscopic images as scaled for said screen are smaller than said screen, providing a border for said images for said screen, wherein said stereoscopic images are further scaled and positioned using a relative base offset to cause objects appearing at a maximum depth to appear closer and to cause objects appearing in front of said single screen to appear closer to said single screen so as to restrict at least one of:

an interocular angle between focussing at a depth of said single screen and focussing on objects appearing at a modified maximum depth; and an interocular angle between focussing at a depth of said single screen and focussing on objects appearing closest in front of said single screen;

so as to reduce eye strain.

2. The method as defined in claim 1, wherein said stereoscopic images are further scaled and positioned to restrict both of an interocular angle between focussing at a depth of said single screen and focussing on objects appearing at a modified maximum depth and an interocular angle between focussing at a depth of said single screen and focussing on objects appearing closest in front of said single screen.

3. The method as defined in claim 2, wherein said stereoscopic images are further scaled to maintain objects appearing at a depth of said single screen to appear at a same depth.

4. The method as defined in claims 1, wherein an interocular angle between viewing an object appearing at a depth on said single screen and objects appearing behind and/or in front of said single screen is less than approximately one degree.

5. The method as defined in claim 1, wherein said stereoscopic images comprise panoramic images, said method further comprising defining a viewing direction within said panoramic images and extracting a portion of said panoramic images using said viewing direction.

6. The method as defined in claim 5, wherein said panoramic images are wide-angle camera lens images, said method further comprising de-warping at least a portion of said panoramic images.

7. The method as defined in claim 5, wherein said panoramic images are fish-eye lens images.

8. The method as defined in claim 1, wherein said stereoscopic images are further scaled and positioned to restrict an interocular angle between focussing at a depth of said single screen and focussing on objects appearing at a modified maximum depth.

9. The method as defined in claim 1, wherein said stereoscopic images are further scaled and positioned to restrict an interocular angle between focussing at a depth of said single screen and focussing on objects appearing closest in front of said single screen.

10. The method as defined in claim 1, further comprising selecting a zoom window within said stereoscopic images to thus change said first field of view, wherein said stereoscopic images are scaled respecting said changed first field of view.

11. The method as defined in claim 10, wherein said zoom window is offset from a center of said stereoscopic images to permit viewing a region of interest within said stereoscopic images.

12. The method as defined in claim 11, wherein viewer input is used to move said offset while viewing said stereoscopic images.

13. A device for processing stereoscopic images for display to a viewer on a single screen, the device comprising a processor and a memory readable by said processor, said memory storing instructions for performing the method as defined in claim 1.

14. A computer program product comprising a non-transitory memory storing instructions for a processor or reconfigurable hardware for performing the method as defined in claim 1.

15. A system for streaming stereoscopic images, the system comprising:
  a server comprising a processor and a non-transitory memory storing instructions, where said instructions, when executed by said processor, are operable to perform the method of processing stereoscopic images in accordance with claim 1, wherein said definition of a second field of view is received for a remote client display providing said single screen, and further comprising encoding said processed stereoscopic images for streaming transmission to said remote client display.

16. A system for streaming stereoscopic images, the system comprising:
  a server comprising a processor and a non-transitory memory storing instructions, where said instructions, when executed by said processor, are operable to perform the method of processing stereoscopic images in accordance with claim 2, wherein said definition of a second field of view is received for a remote client display providing said single screen, and further comprising encoding said processed stereoscopic images for streaming transmission to said remote client display.

17. A system for streaming stereoscopic images, the system comprising:
  a server comprising a processor and a non-transitory memory storing instructions, where said instructions, when executed by said processor, are operable to perform the method of processing stereoscopic images in accordance with claim 4, wherein said definition of a second field of view is received for a remote client display providing said single screen, and further comprising encoding said processed stereoscopic images for streaming transmission to said remote client display.

18. A system for streaming stereoscopic images, the system comprising:
  a server comprising a processor and a non-transitory memory storing instructions, where said instructions, when executed by said processor, are operable to perform the method of processing stereoscopic images in accordance with claim 5, wherein said definition of a second field of view is received for a remote client display providing said single screen, and further comprising encoding said processed stereoscopic images for streaming transmission to said remote client display.

19. A system for streaming stereoscopic images, the system comprising:
  a server comprising a processor and a non-transitory memory storing instructions, where said instructions, when executed by said processor, are operable to perform the method of processing stereoscopic images in accordance with claim 8, wherein said definition of a second field of view is received for a remote client display providing said single screen, and further comprising encoding said processed stereoscopic images for streaming transmission to said remote client display.

20. A system for streaming stereoscopic images, the system comprising:
  a server comprising a processor and a non-transitory memory storing instructions, where said instructions, when executed by said processor, are operable to perform the method of processing stereoscopic images in accordance with claim 10, wherein said definition of a second field of view is received for a remote client display providing said single screen, and further comprising encoding said processed stereoscopic images for streaming transmission to said remote client display.

\* \* \* \* \*